(12) United States Patent
Moore et al.

(10) Patent No.: US 10,198,969 B2
(45) Date of Patent: Feb. 5, 2019

(54) SURGICAL SIMULATION SYSTEM AND ASSOCIATED METHODS

(71) Applicant: KINDHEART, INC., Chapel Hill, NC (US)

(72) Inventors: Allen Wendell Moore, Cary, NC (US); Samuel D. Drew, Chapel Hill, NC (US); W. Andrew Grubbs, Chapel Hill, NC (US); Kevin R. Simpson, Morrisville, NC (US); Samuel C. Felts, Jr., Raleigh, NC (US)

(73) Assignee: KINDHEART, INC., Chapel Hill, NC (US)

( * ) Notice: Subject to any disclaimer, the term of this patent is extended or adjusted under 35 U.S.C. 154(b) by 313 days.

(21) Appl. No.: 15/266,349

(22) Filed: Sep. 15, 2016

(65) Prior Publication Data

US 2017/0076636 A1    Mar. 16, 2017

Related U.S. Application Data

(60) Provisional application No. 62/219,550, filed on Sep. 16, 2015.

(51) Int. Cl.
*G09B 23/28* (2006.01)
*G09B 23/30* (2006.01)

(52) U.S. Cl.
CPC ......... *G09B 23/306* (2013.01); *G09B 23/285* (2013.01)

(58) Field of Classification Search
USPC ............... 434/262, 267, 268, 269, 272, 274
See application file for complete search history.

(56) References Cited

U.S. PATENT DOCUMENTS

| 4,266,669 A | 5/1981 | Watson |
| D293,820 S | 1/1988 | Guth et al. |
| 4,773,865 A * | 9/1988 | Baldwin ............... G09B 23/30 434/267 |
| 4,847,932 A | 7/1989 | Baribault, Jr. |
| 5,217,003 A | 6/1993 | Wilk |
| 5,358,408 A | 10/1994 | Medina |

(Continued)

FOREIGN PATENT DOCUMENTS

| BE | 1020674 | 3/2014 |
| EP | 2070487 | 6/2009 |

(Continued)

OTHER PUBLICATIONS

U.S. Appl. No. 61/554,471, filed Nov. 2, 2011.

(Continued)

*Primary Examiner* — Kurt Fernstrom
(74) *Attorney, Agent, or Firm* — Allen, Dyer, Doppelt + Gilchrist, P.A.

(57) ABSTRACT

A surgical simulation device may include a support structure, a tray carried by the support structure, and animal tissue carried by the tray. A simulated human skeleton portion may be carried by the support structure above the animal tissue, and simulated human skin covers the simulated human skeleton portion. The support structure may permit selective horizontal and vertical positioning of the tray relative to the support structure to thereby permit selective horizontal and vertical positioning of the animal tissue relative to the simulated human skeleton portion and simulated human skin.

27 Claims, 28 Drawing Sheets

(56) References Cited

U.S. PATENT DOCUMENTS

| | | | |
|---|---|---|---|
| 5,403,191 A * | 4/1995 | Tuason | G09B 23/285 |
| | | | 434/262 |
| 5,425,644 A | 6/1995 | Szinicz | |
| 5,609,560 A | 3/1997 | Ichikawa et al. | |
| 5,791,908 A | 8/1998 | Gillio | |
| 5,792,135 A | 8/1998 | Madhani et al. | |
| 5,817,084 A | 10/1998 | Jensen | |
| 5,873,732 A | 2/1999 | Hasson | |
| 5,882,206 A | 3/1999 | Gillio | |
| 5,947,743 A | 9/1999 | Hasson | |
| 5,951,301 A | 9/1999 | Younker | |
| 6,077,221 A * | 6/2000 | Fowler, Jr. | A61B 17/0293 |
| | | | 434/262 |
| 6,234,804 B1 * | 5/2001 | Yong | G09B 23/285 |
| | | | 434/267 |
| 6,331,181 B1 | 12/2001 | Tierney et al. | |
| 6,336,812 B1 | 1/2002 | Cooper et al. | |
| 6,441,577 B2 | 8/2002 | Blumenkranz et al. | |
| 6,491,701 B2 | 12/2002 | Tierney et al. | |
| D471,641 S | 3/2003 | McMichael et al. | |
| 6,659,939 B2 | 12/2003 | Moll et al. | |
| 6,780,016 B1 | 8/2004 | Toly | |
| 6,790,043 B2 | 9/2004 | Aboud | |
| 6,817,974 B2 | 11/2004 | Cooper et al. | |
| D565,743 S | 4/2008 | Phillips et al. | |
| 7,413,565 B2 | 8/2008 | Wang et al. | |
| D608,456 S | 1/2010 | Sandel | |
| D618,821 S | 6/2010 | Larsen | |
| 7,798,815 B2 | 9/2010 | Ramphal et al. | |
| D638,137 S | 5/2011 | Gross et al. | |
| 7,963,913 B2 | 6/2011 | Devengenzo et al. | |
| D650,912 S | 12/2011 | Tomes et al. | |
| D676,573 S | 2/2013 | Austria | |
| 8,600,551 B2 | 12/2013 | Itkowitz et al. | |
| 8,656,929 B2 | 2/2014 | Miller et al. | |
| D704,856 S | 5/2014 | Tomes et al. | |
| 9,259,289 B2 | 2/2016 | Zhao et al. | |
| 9,271,798 B2 | 3/2016 | Kumar et al. | |
| 9,342,997 B2 | 5/2016 | Feins et al. | |
| 9,418,574 B2 * | 8/2016 | Park | G09B 23/32 |
| D773,686 S | 12/2016 | Moore | |
| 9,959,786 B2 * | 5/2018 | Breslin | G09B 23/285 |
| 2004/0033477 A1 | 2/2004 | Ramphal et al. | |
| 2006/0087746 A1 | 4/2006 | Lipow | |
| 2006/0148062 A1 | 7/2006 | Hassanein et al. | |
| 2006/0178559 A1 | 8/2006 | Kumar et al. | |
| 2006/0258938 A1 | 11/2006 | Hoffman et al. | |
| 2007/0156017 A1 | 7/2007 | Lamprecht et al. | |
| 2007/0166682 A1 * | 7/2007 | Yarin | G09B 23/285 |
| | | | 434/267 |
| 2008/0138781 A1 * | 6/2008 | Pellegrin | G09B 23/34 |
| | | | 434/274 |
| 2009/0088634 A1 | 4/2009 | Zhao et al. | |
| 2010/0169815 A1 | 7/2010 | Zhao et al. | |
| 2010/0274087 A1 | 10/2010 | Diolaiti et al. | |
| 2012/0290134 A1 | 11/2012 | Zhao et al. | |
| 2013/0038707 A1 | 2/2013 | Cunningham et al. | |
| 2013/0107207 A1 | 5/2013 | Zhao et al. | |
| 2013/0226343 A1 | 8/2013 | Baiden | |
| 2013/0330700 A1 | 12/2013 | Feins et al. | |
| 2014/0051049 A1 * | 2/2014 | Jarc | G09B 23/30 |
| | | | 434/267 |
| 2014/0135648 A1 | 5/2014 | Holoien et al. | |
| 2014/0186809 A1 | 7/2014 | Hendrickson et al. | |
| 2014/0236175 A1 | 8/2014 | Cooper et al. | |
| 2014/0282196 A1 | 9/2014 | Zhao et al. | |
| 2014/0329217 A1 | 11/2014 | Barsness et al. | |
| 2015/0024362 A1 | 1/2015 | Feins et al. | |
| 2015/0257958 A1 | 9/2015 | Allen et al. | |
| 2016/0027325 A1 | 1/2016 | Malhotra | |
| 2016/0314710 A1 | 10/2016 | Jarc et al. | |
| 2016/0314711 A1 | 10/2016 | Grubbs | |
| 2016/0314712 A1 | 10/2016 | Grubbs | |
| 2016/0314716 A1 | 10/2016 | Grubbs | |
| 2016/0314717 A1 | 10/2016 | Grubbs | |
| 2016/0329000 A1 | 11/2016 | Feins et al. | |
| 2017/0169734 A1 | 6/2017 | Wen et al. | |
| 2017/0294146 A1 | 10/2017 | Grubbs | |

FOREIGN PATENT DOCUMENTS

| | | |
|---|---|---|
| ES | 2144375 | 6/2000 |
| WO | 0180203 | 10/2001 |
| WO | 2012058527 | 5/2012 |
| WO | 2012058533 | 5/2012 |
| WO | 2012060901 | 5/2012 |
| WO | 2015095715 | 6/2015 |
| WO | 2016176273 | 11/2016 |

OTHER PUBLICATIONS

Turner, "Experiences with sheep as an animal model for shoulder surgery: Strength and shortcomings"; Journal of Shoulder and Elbow Surgery Board of Trustees, 2007, pp. 158S-163S.

La Torre et al., "Resident training in laparoscopic colorectal surgery: role of porcine model", World J. Surg., Sep. 2012, 36(9), 2 pgs.

Feins, "Expert commentary: Cardiothoracic surgical simulation", The Journal of Thoracic and Cardiovascular Surgery, 2008, 135(3), p. 485.

Hicks et al., "Cardiopulmonary bypass simulation at the Boot Camp", The Journal of Thoracic and Cardiovascular Surgery, 2011, 141(1), pp. 284-292.

Ramphal et al., "A high fidelity tissue-based cardiac surgical simulator", European Journal of Cardio-thoracic Surgery, 27, 2005, pp. 910-916.

Tesche et al., "Simulation Experience Enhances Medical Students' Interest in Cardiothoracic Surgery", Ann Thorac Surg., 2010, 90, pp. 1967-1974.

http://research.unc.edu/otd/, retrieved Jun. 3, 2009, Pulmonary Surgical Simulator, Carolina Blue Opportunity webpage, 2 pgs.

hittp://www.meti.com/products_ps_hps.htm, retrieved Oct. 18, 2010; METI HPS—Human Patient Simulator webpage, 1 pg.

www.laerdal.com; retrieved Oct. 18, 2010, Laerdal homepage with SimNewB description, 1 pg.

http://www.med.unc.edu/~dedmon/Site/Photos.html, retrieved Oct. 14, 2011, "Development of a Pulmonary Surgical Simulator description", 3 pgs.

http://www.med.unc.edu/~dedmon/Site/Photos.html, retrieved Oct. 14, 2011; Development of a Pulmonary Surgical Simulator photos, 3 pgs.

U.S. Appl. No. 61/554,741, filed Nov. 2, 2011 (cited application is stored in the USPTO's IFW system).

Clark Fuller, "Reduction of intraoperative air leaks with Progel in pulmonary resection: a comprehensive review," Journal of Cardiothoracic Surgery, 2013, 8:90, 7 pgs.

Robotic Cardiac Surgery, Sep. 15, 2014, John Hopkins Medicine Health Library, pp. 1-5.

* cited by examiner

SURGICAL SIMULATION SYSTEM AND ASSOCIATED METHODS

RELATED APPLICATION

This application is based upon provisional application Ser. No. 62/219,550, filed Sep. 16, 2015, the entire contents of which are incorporated by reference herein.

TECHNICAL FIELD

This invention relates generally to a surgical simulation system to allow for realistic surgical training.

BACKGROUND

Surgical skill training may be imperative before a surgeon or surgical trainee attempts surgery on live patients. New surgical procedures are constantly being developed that may require both surgeons and surgical trainees to practice new surgical procedures before operating on live patients.

Historically, surgical training has been provided through apprenticeships almost exclusively offered in hospital settings. Residents performed surgery under the supervision of more experienced surgeons. The type of situations presented to the surgeon trainee was largely driven by chance as the nature and timing of situations needing surgery found in patients was not under anyone's control. This model of using a stream of situations as presented by clinical service of human patients may not provide a model for repetition until mastery. As the number of hours that residents are available for surgery has decreased, the range of surgical events presented to surgical residents has also decreased. The failure rate for surgery board certifications exams is now in the range of 26%. For specialized board certifications such as thoracic surgery, the failure rate has been as high as 33%.

For this reason, simulators that provide for realistic surgical environments for surgical training purposes have become increasingly valuable tools. Many known surgical training stimulators exist that use organ models or computer-generated virtual reality systems. These training simulators, however, only provide limited realism and are expensive. For this reason, oftentimes, anaesthetized animals are used for vivo training. However, ethical considerations surrounding the use of the live animals for training is a concern for some. Often times, human cadavers are also used. Like with the use of live animals, concerns still surround the use of cadaver organs as the waste is considered toxic, making clean-up and disposal problematic.

More recently, simulators have been developed that allow for a full operative experience with cardiac surgery and with lung surgery (both open and thoracoscopic) without the use of live animals. Such lifelike simulators can use either animal (e.g., porcine) organs, or human cadaver organs for surgery education and training. The simulators use organs that have been reanimated using hydraulics, reperfusion, and computer orchestration, and are then placed in a human equivalent model.

In one example, the model uses a porcine heart that is prepared with an intraventricular balloon in each ventricle. The balloons are inflated by a computer controlled activator. The computer program is able to simulate the beating heart, various cardiac arrhythmias, hypo- and hypertensive states, cardiac arrest, and even placement of an intra-aortic balloon pump. The model is perfused with a washable blood substitute. When placed in a replica of the pericardial well in a mannequin, the system is capable of duplicating most aspects of cardiac surgery including all aspects of cardiopulmonary bypass, coronary artery bypass grafting both on and off bypass, aortic valve replacement, heart transplantation, and aortic root reconstruction. The computer protocols also make experience with adverse events such as accidental instillation of air into the pump circuit, aortic dissection, and sudden ventricular fibrillation after discontinuation of cardiopulmonary bypass possible.

Descriptions of work on surgical simulators are found in Feins et al. WO 2012/058533; Ramphal et al. U.S. Pat. No. 7,798,815; Cooper et al. U.S. Pat. No. 6,336,812; Hasson U.S. Pat. No. 5,873,732; Szinicz U.S. Pat. No. 5,425,644; and Younker U.S. Pat. No. 5,951,301, all of which are incorporated by reference in their entireties into this application.

Published U.S. Application No. 2015/0024362 to Feins et al. discloses a significant advance in surgical simulation whereby a generally flat tray having a central indentation for receiving an animated animal heart and lung block, is supported on a basket. The entire contents of the published Feins et al. application are incorporated by reference herein. A half torso can be prepped and fixed to the tray over the animal organs. Unfortunately, the relative positioning of the torso and animated animal heart and lung block is fixed. In addition, the set up and disposal of the animal organs may be tedious and cause significant downtime before reusing the simulator.

A need exists to help facilitate and easily repeat such realistic surgical simulations to increase the educational experience and practice achieved through the introduction of the new surgical simulators. In particular, a need exists for the quick and easily set-up, as well as disposal of the organs, so that such simulations can be repeatedly performed without unnecessary downtime in most any environment. In this manner, procedures, tools and techniques can be demonstrated and practiced repeatedly, with minimal downtime between simulations, in most any environment.

SUMMARY

This summary is provided to introduce a selection of concepts that are further described below in the detailed description. A surgical simulation device and associated methods are provided for simulating realistic surgery on animal organs, which is particularly useful for simulating human surgeries, such as using robotics. The surgical simulation device may comprise a support structure, a tray carried by the support structure, and animal tissue carried by the tray. A simulated human skeleton portion may be carried by the support structure above the animal tissue, and simulated human skin may cover the simulated human skeleton portion. In addition, the support structure may permit selective horizontal and vertical positioning of the tray relative to the support structure to thereby permit selective horizontal and vertical positioning of the animal tissue relative to the simulated human skeleton portion and simulated human skin. Accordingly, the positioning of the animal tissue relative to the adjacent human skeleton portion and skin can be readily set for a variety of training scenarios. In addition, the removal and set-up times can also be enhanced.

The support structure may comprise a base support, a stand carried by the base support, and a caddy adjustably carried by the stand and receiving the tray thereon. The stand may comprise opposing walls, with each wall having a plurality of vertically spaced, horizontally extending slots therein; and the caddy may comprise a set of projections extending outwardly and slidably received within selected ones of the slots. Each of the slots may comprise a notched slot, for example.

The simulated human skeleton portion may comprise a spinal column and a rib cage coupled thereto. Moreover, the simulated human skin may comprise an innermost layer and an outermost layer, and with the innermost layer protruding between ribs of the rib cage.

The simulated human skeleton portion may comprise a clavicle and scapula adjacent the rib cage. The simulated human skeleton, in some embodiments, may comprise a pelvis coupled to the spinal column at a fixed angle. In other embodiments, the simulated human skeleton may comprise a pelvis coupled to the spinal column at an adjustable angle. A simulated human diaphragm may be provided within the rib cage.

The animal tissue may comprise a heart and lung block, for example. In addition, the surgical simulation device may also include at least one animating device coupled to the heart and lung block. The animal tissue may comprise harvested porcine tissue, and, in other embodiments, the animal tissue may comprise human cadaver tissue.

A method aspect is for surgical simulation and may comprise positioning a tray carrying animal tissue on a support structure, and manipulating the support structure to selectively horizontally and vertically position the tray relative to the support structure to thereby selectively horizontally and vertically position the animal tissue relative to a simulated human skeleton portion carried by the support structure. The method may also include covering the simulated human skeleton portion with simulated human skin, and performing at least one surgical procedure on the animal tissue while penetrating through the simulated human skeleton portion and simulated human skin.

The support structure may comprise a base support, a stand carried by the base support, and a caddy adjustably carried by the stand and receiving the tray thereon. The stand may comprise opposing walls having vertically spaced, horizontally extending slots therein, and the caddy may comprise a set of projections extending outwardly and slidably received within selected ones of the slots.

The summary is meant to provide an introduction to the concepts that are disclosed without being an exhaustive list of the many teachings and variations upon those teachings that are provided in the extended discussion within this disclosure.

Other devices, apparatus, systems, methods, features and advantages will be or will become apparent to one with skill in the art upon examination of the following figures and detailed description. It is intended that all such additional systems, methods, features and advantages be included within this description, be within the scope of the invention, and be protected by the accompanying claims. Further, it is not necessary to provide examples of every possible combination of the inventive concepts described in this application as one of skill in the art will recognize that inventive concepts illustrated in the application can be combined together in order to address a specific application or modified based upon concepts known in the art to address specific applications.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Prime notation is used to indicate similar elements in alternative embodiments.

Figure 1:
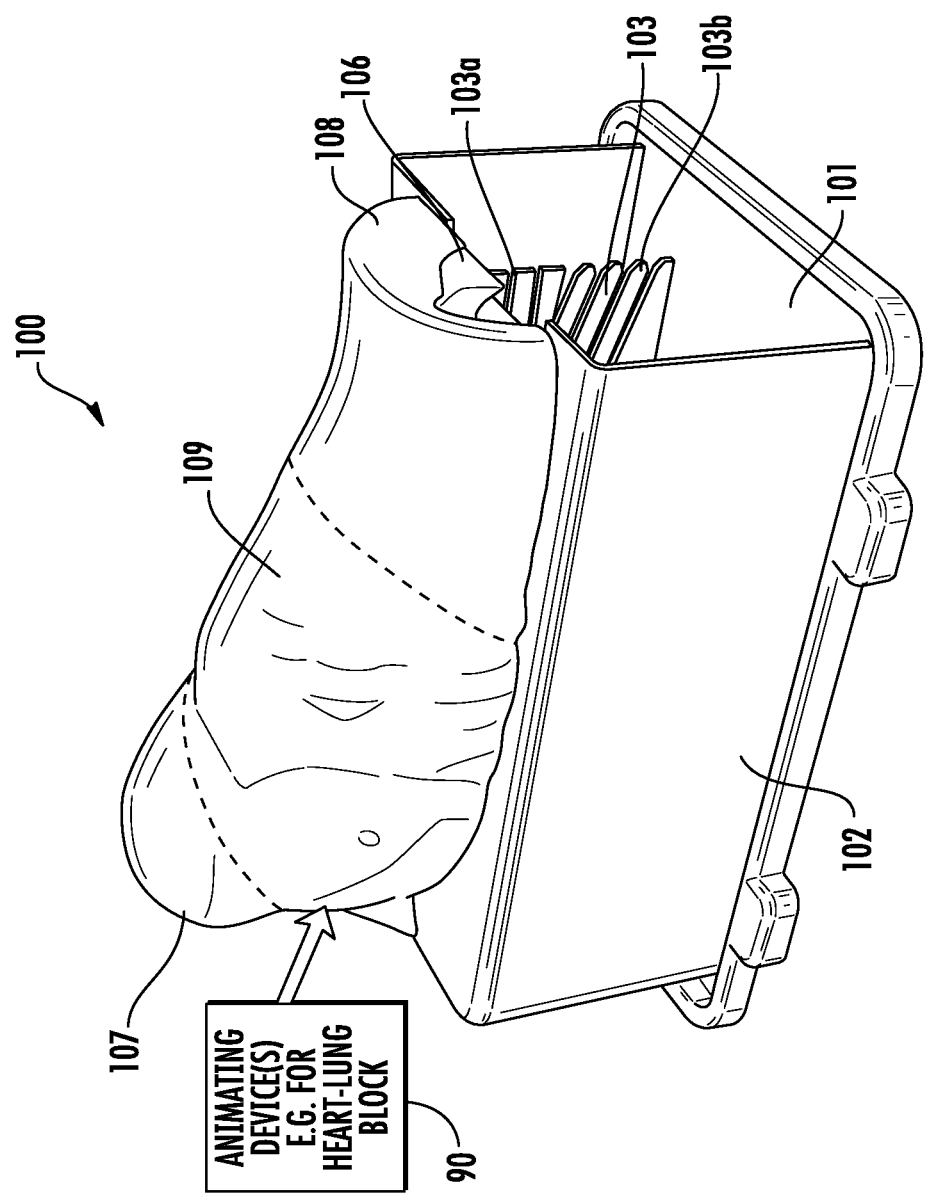
FIG. 1 illustrates a side perspective view of one example of one implementation of a surgical simulation assembly of the present invention.

FIG. 1 illustrates a top perspective view of one example of a surgical simulation assembly 100. The surgical simulation assembly 100 includes a support base 101, a stand 102 for supporting a simulated human torso comprising simulated human skin 107, 108, 109, a simulated human thoracic skeleton 106, which may include a clavicle 110 (FIG. 23) and a human diaphragm 111 (FIG. 24). The stand 102 illustratively includes two opposing plates 103, each of which has a series of straight slots 103a and diagonal slots 103b cut into them, that form the supports for a tissue system comprising a disposable tray 105 (FIG. 11) and a caddy 104 (FIG. 12). The disposable tray fits into the caddy, whose height can be elevated or lowered within the rib cage of the simulated skeleton 106 as described below for use in the surgical simulation procedure. In other words, a support structure may be considered as comprising the base support 101, the stand 102 carried by the base support, and the caddy 104 adjustably carried by the stand and receiving the tray 105 thereon. The support structure permits selective horizontal and vertical positioning of the tray 105 relative to the support structure to thereby permit selective horizontal and vertical positioning of the animal tissue relative to the simulated human skeleton portion 106 and simulated human skin 107, 108, 109.

All the materials of the surgical simulation assembly 100 may be made of plastic, metal or other material necessary to provide the desired support system for the surgical simulation. At least one animating device 90 is coupled to the tissue to perform the various animating functions as will explained in greater detail below.

Figure 2:
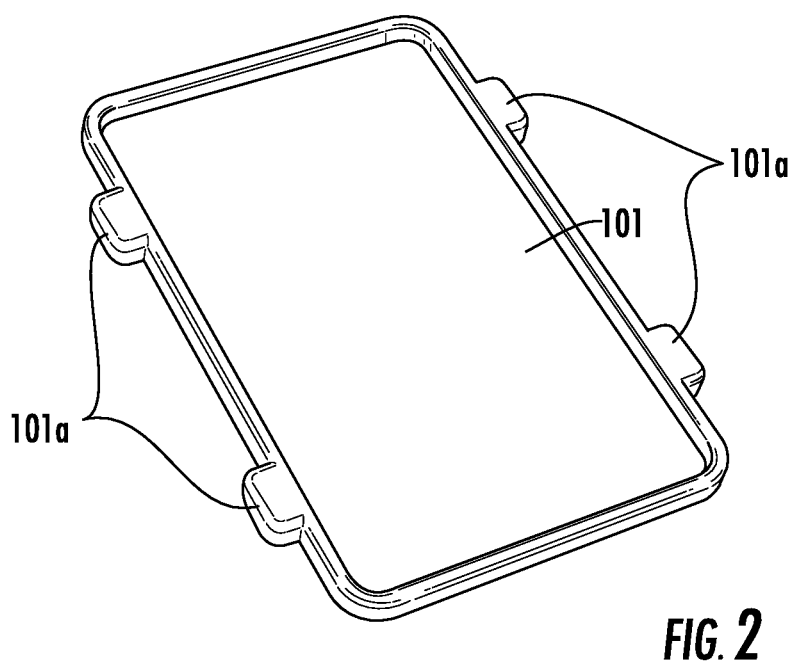
FIG. 2 illustrates a top perspective view of one example of one implementation of a support base for the surgical simulation assembly of the present invention.

FIG. 2 illustrates a top perspective view of one example of a support base 101 having two sets of opposing handles 101a on each side to enable movement of the surgical simulation system. In the illustrated example, the support base 101 comprises a generally flat rectangular tray that may be molded, or alternatively, machined, or formed using 3D printing technology. The support base 101 may be placed on a surgical table or other elevated support as necessary to simulate surgery using the surgical simulation assembly 100.

Figure 3:
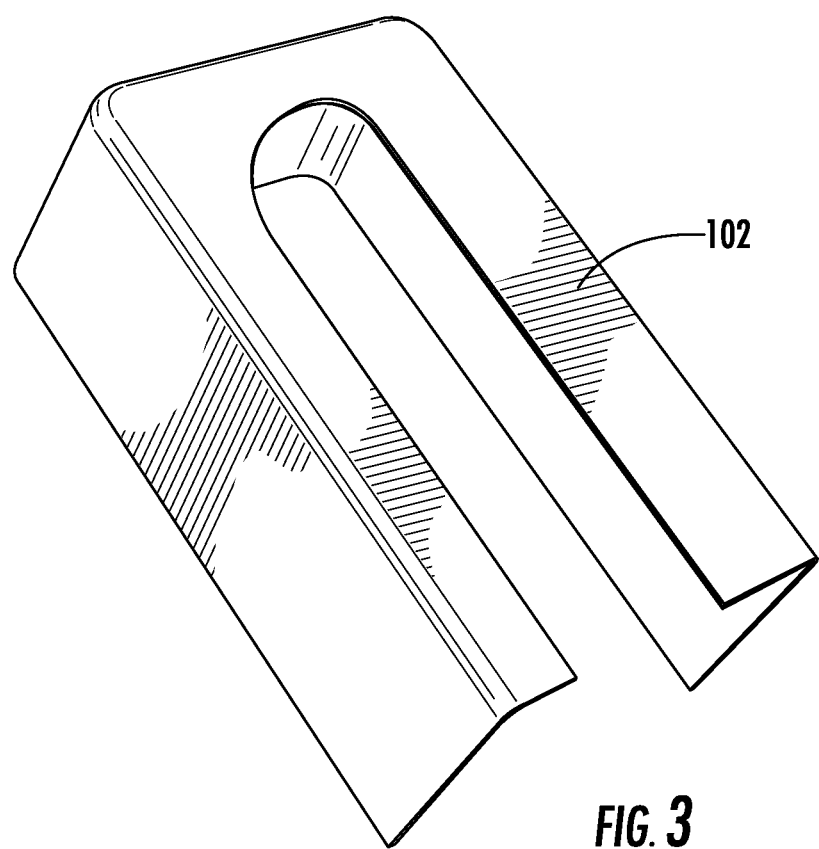
FIG. 3 illustrates a top perspective view of one example of one implementation of a stand for the surgical simulation assembly of the present invention.

FIG. 3 illustrates a top perspective view of one example of a stand 102 that is attached to the support base 101. The stand 102 is open on the bottom, along the front or back side and includes an elongated U-shaped opening on its top for permitting the stand to be placed over the caddy 104 and the molded tray 105, which is designed to hold animal-derived organs for simulated surgery. The tray 105 and organs are sealed into a bag, which together form a "cassette."

Figure 4:
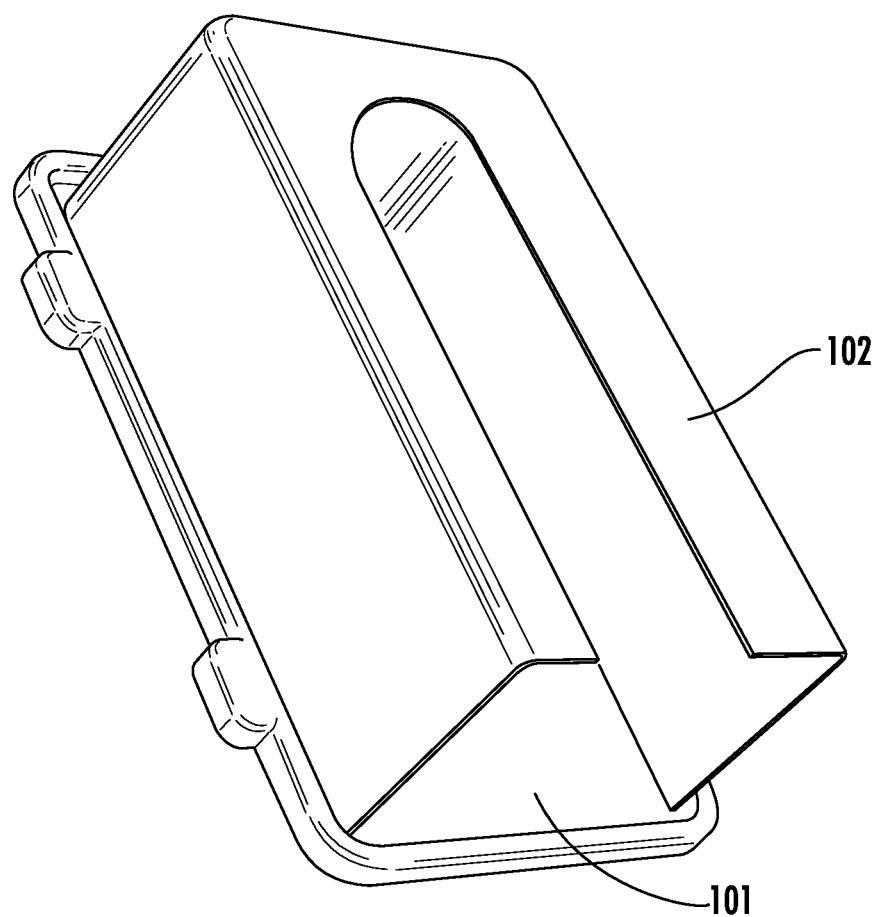
FIG. 4 illustrates a top perspective view of the stand of FIG. 3 mounted upon the support tray of FIG. 1.

FIG. 4 illustrates a top perspective view of one example of a stand 102 resting on the support base 101. The stand 102 may rest upon or, be affixed or mounted to, the support base 101.

Figure 5:
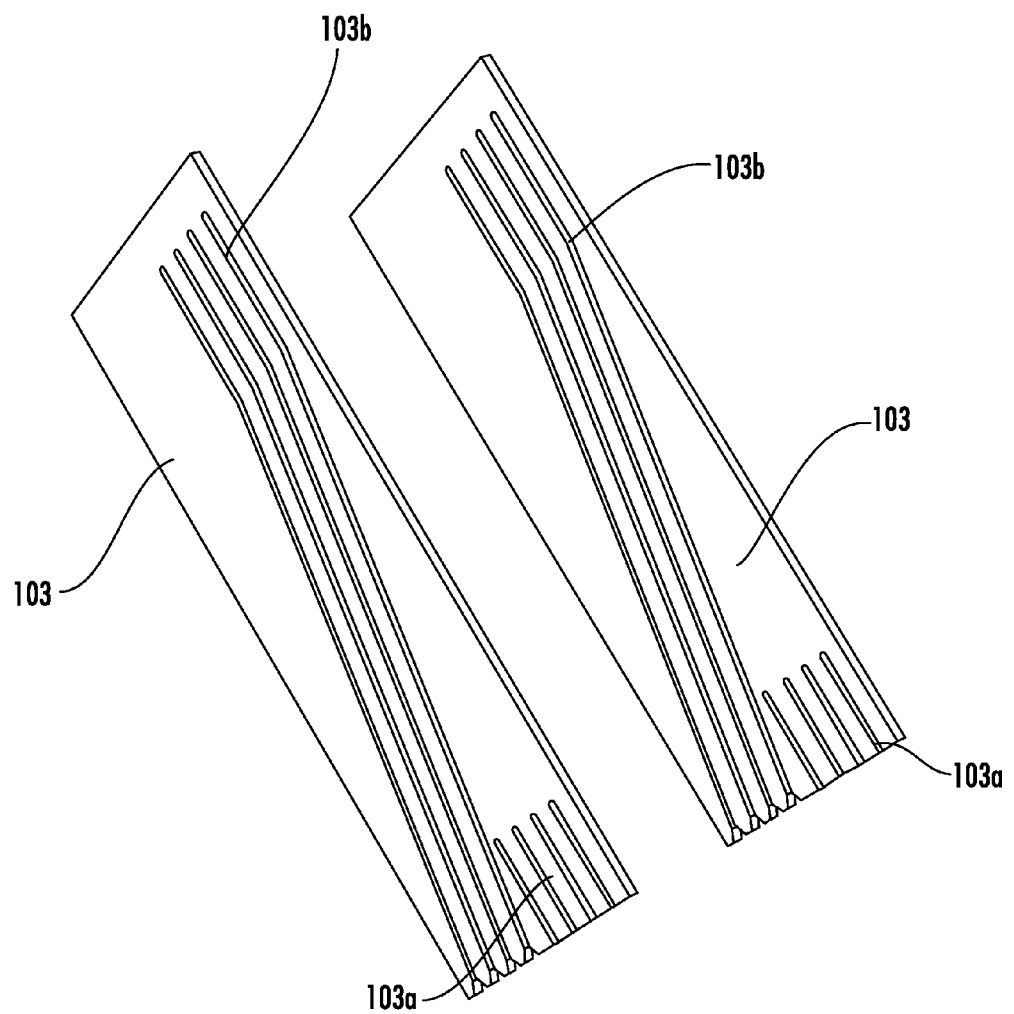
FIG. 5 illustrates a top perspective view of one example of opposing plates containing adjustment grooves that can be mounted within the stand of FIG. 3 and resting upon the base support of FIG. 2.

FIG. 5 illustrates a top perspective view of one example of two opposing plates that are affixed to the support base 101 and considered as part of the stand 102. Each of the two plates 103 contains two sets of slots: one set 103a is cut straight into the plates for a distance of between 1-3" (with 2.25" being optimal); and a second set 103b cut on first on a diagonal and then straight for a distance of between 1-3" (with 2.25" being optimal). Alternatively, the two sets of grooves or slots may be molded onto the sides of the stand 102, as will be described in greater detail below. The two straight slots are in alignment with each other to level the caddy when mounted to the opposing plates. The plates 103 may be designed as separate pieces from the side walls of the stand, or, alternatively, the slots may be integrated into the opposing sides of the stand 102, internal to the stand 102.

Figure 6:
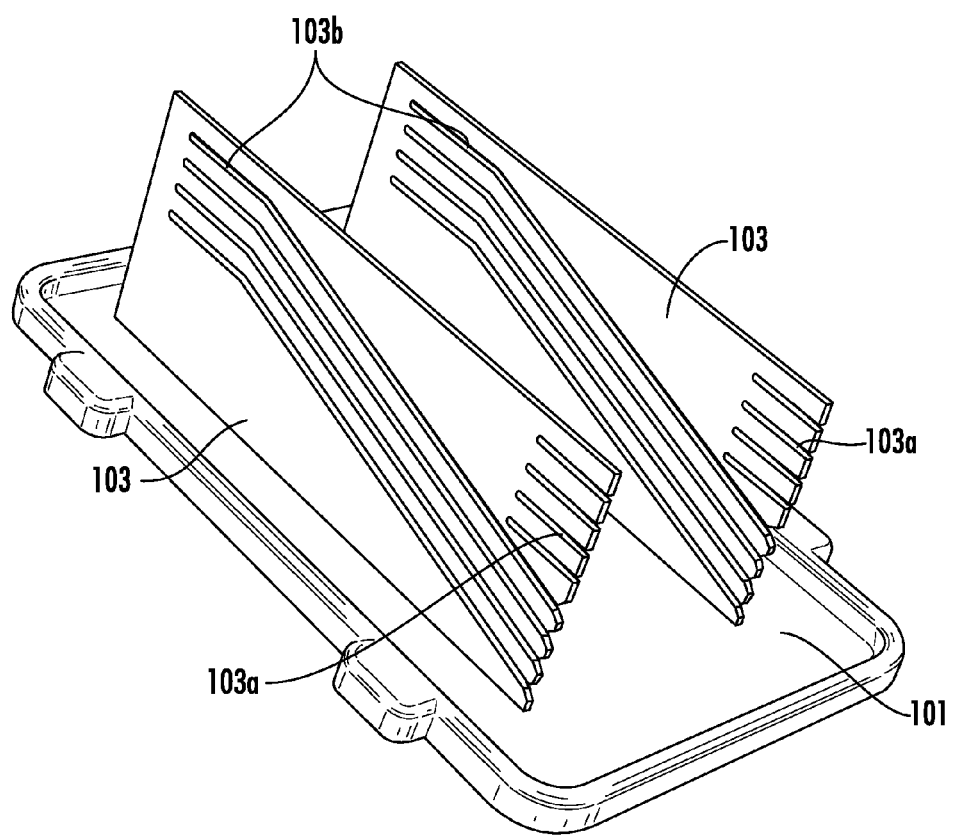
FIG. 6 illustrates a top perspective view of the two opposing plates containing adjustment grooves of FIG. 5 resting upon the support base of FIG. 2.
Figure 7:
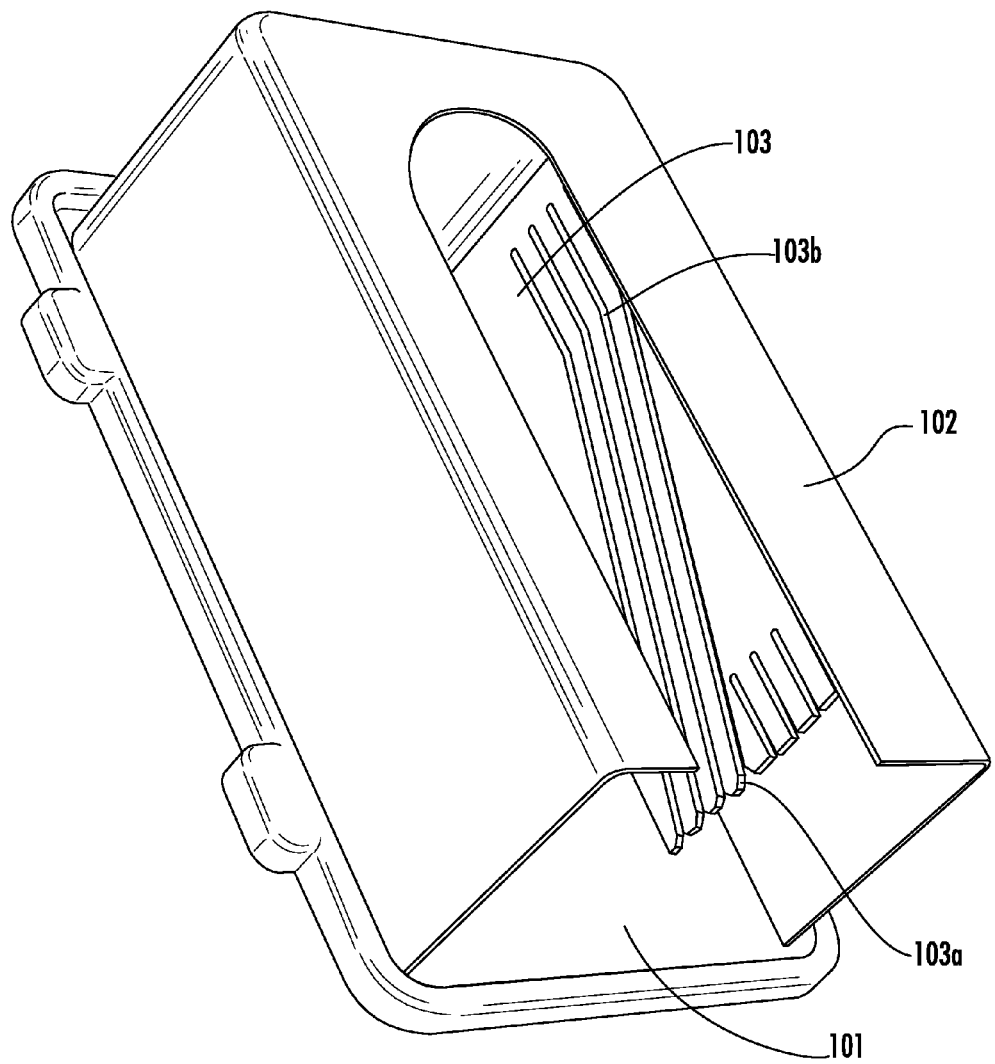
FIG. 7 illustrates a top perspective view of one of the two opposing plates containing adjustment grooves situated within the stand of FIG. 3 and resting upon the support base of FIG. 2.

FIG. 6 illustrates a top perspective view of the opposing plates 103 with grooves 103a and 103b affixed to the support base 101. FIG. 7 illustrates a top perspective view of the opposing plates 103 within the surrounding portions of the stand 102 affixed to the support base 101. Again, the grooves or slots may be integrated into opposing sides of the stand 102, to eliminate the separate plates 103.

Figure 8:
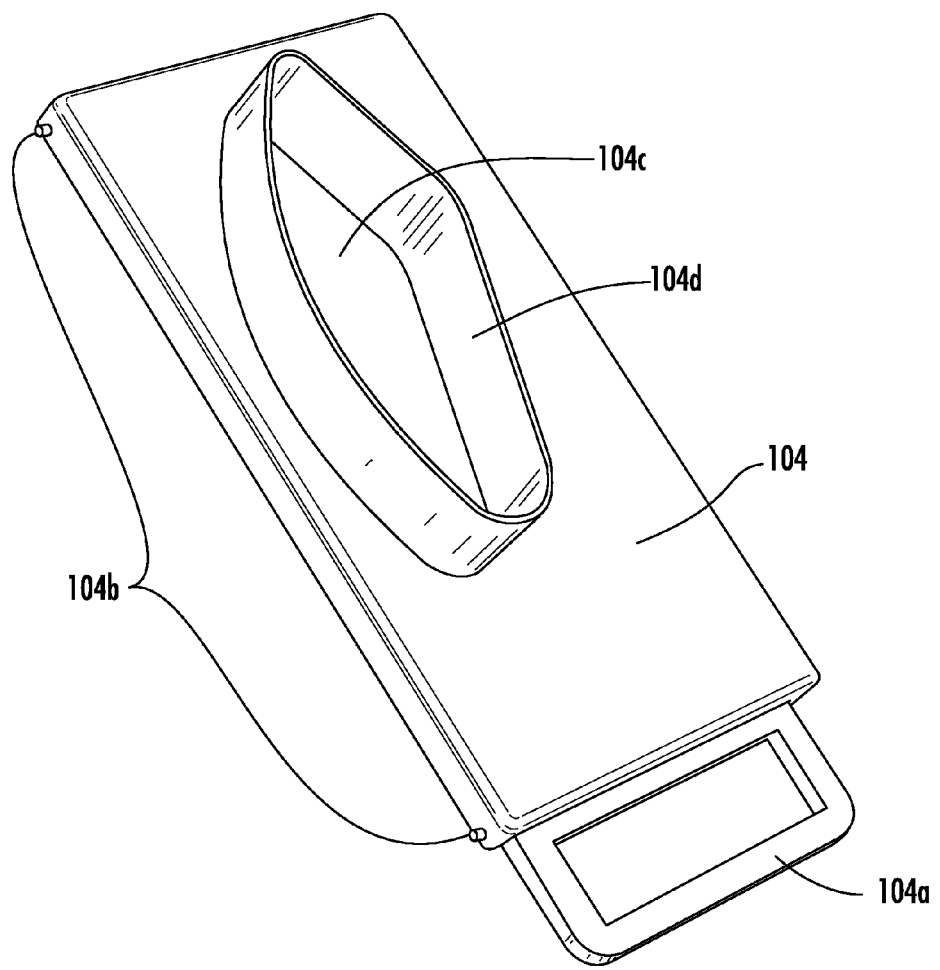
FIG. 8 illustrates a top perspective view of one example of a caddy for holding a tray supporting animal-derived organs.

FIG. 8 illustrates a top perspective view of one example of a caddy 104. The caddy 104 has a handle 104a for inserting and removing it from the surgical simulation assembly, and two sets of opposing projections or pegs 104b protruding from the top and bottom of each side. By use of these pegs, the caddy 104 may be slidably engaged within the slots 103a and 103b of the opposing plates 103. The pegs 104a may be slidably engaged first into a pair of diagonal slots 103b that permit the caddy 104 to be raised or lowered within the rib cage portion of the simulated skeleton 106 and then locked into the selected position by being slidably engaged into a pair of straight slots 103a. The caddy further includes a hole 104c at one end surrounded by a raised perimeter 104d that forms a boundary in which rests the tray 105. The tray may still be able to move laterally, front and back, along the opposing plates 103 at a distance of the front pair of straight slots 103a.

Figure 9:
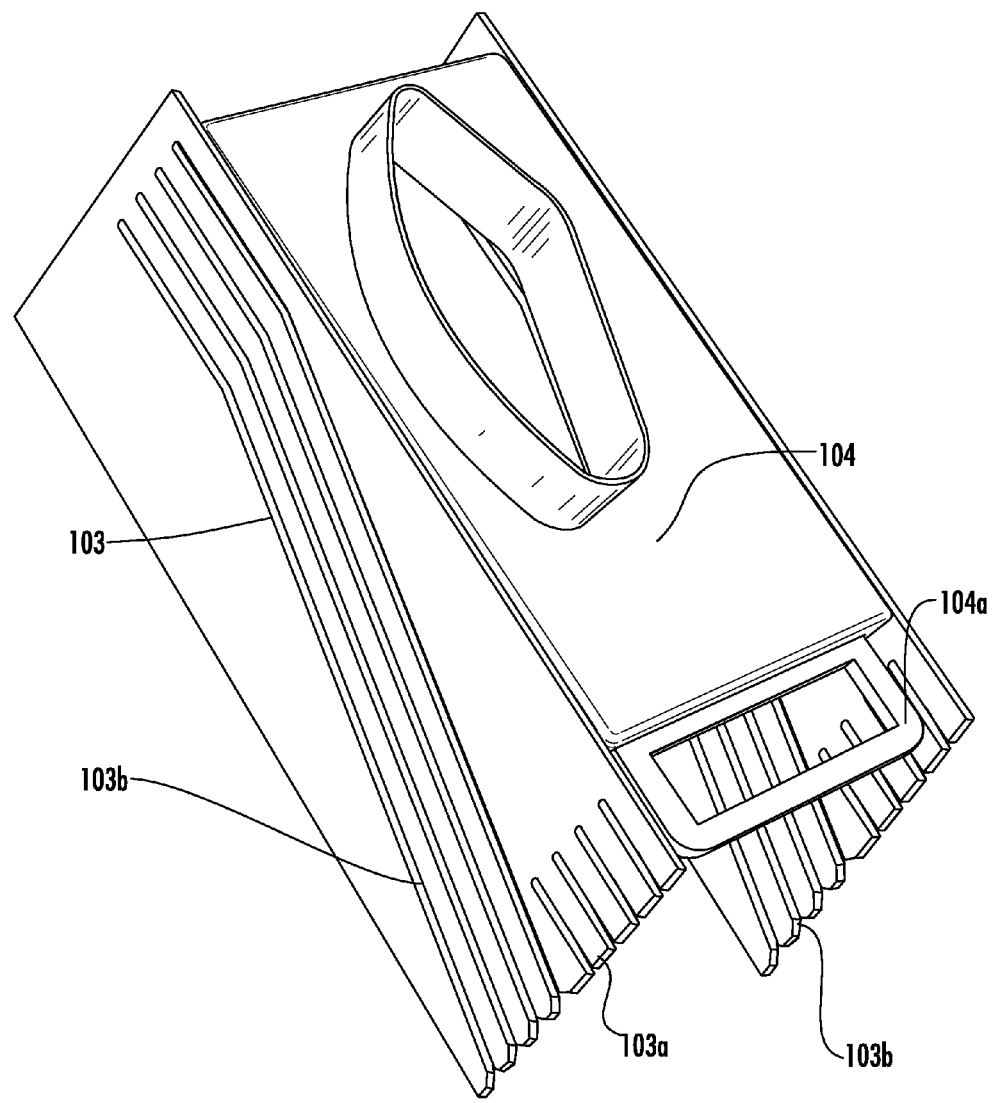
FIG. 9 illustrates a top perspective view of the caddy of FIG. 9 slidably engaged within the support grooves of the opposing plates of FIG. 5.
Figure 10:
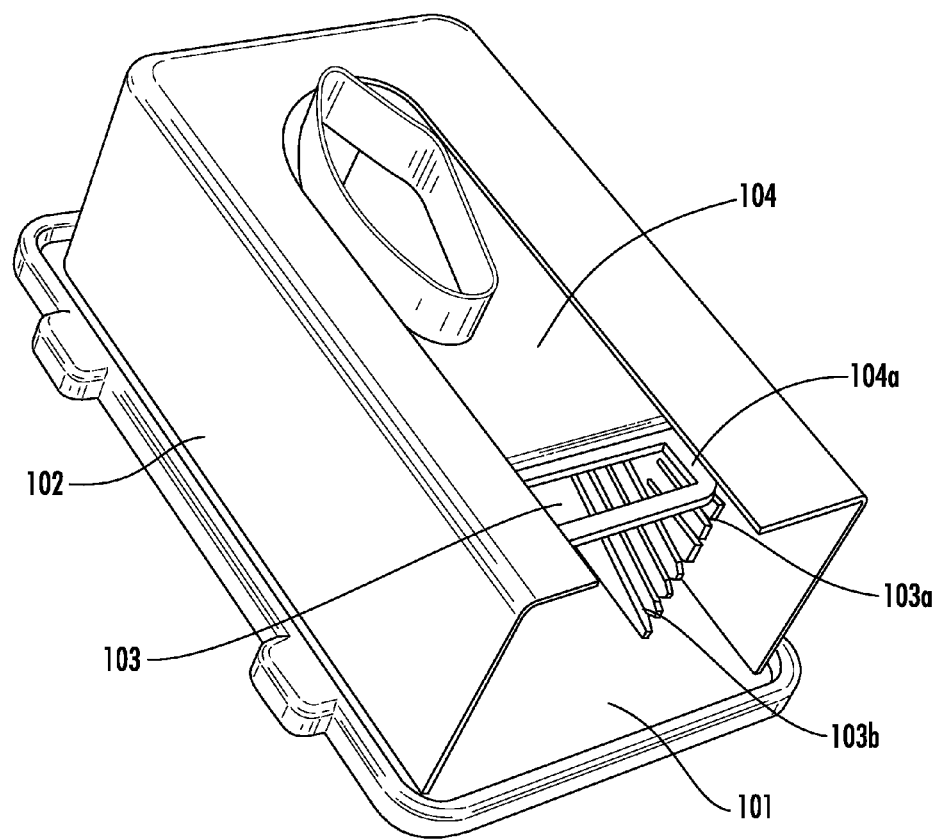
FIG. 10 illustrates a top perspective view of the caddy of FIG. 9 positioned within the stand of FIG. 3.

FIG. 9 illustrates a top perspective view of the caddy 104 slidably engaged in the slots 104a and 104b of the opposing plates 103. FIG. 10 illustrates a top perspective view of part of the surgical simulation assembly 100 comprising the support base 101, the stand 102 including the opposing plates 103, and the caddy 104.

Figure 11:
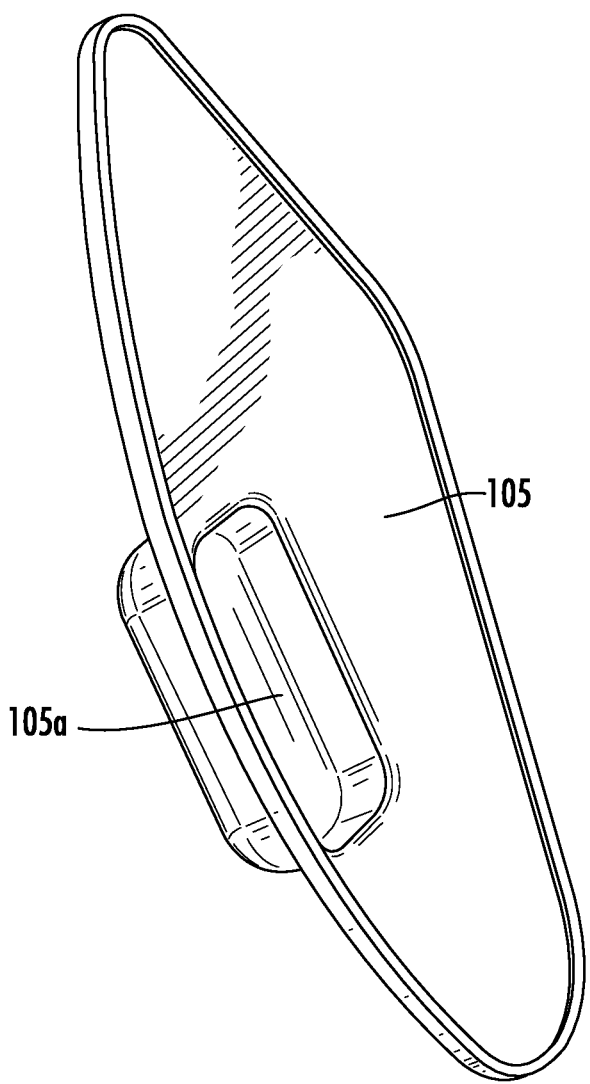
FIG. 11 illustrates a top perspective view of one example of a tray for holding animal-derived organs.
Figure 12:
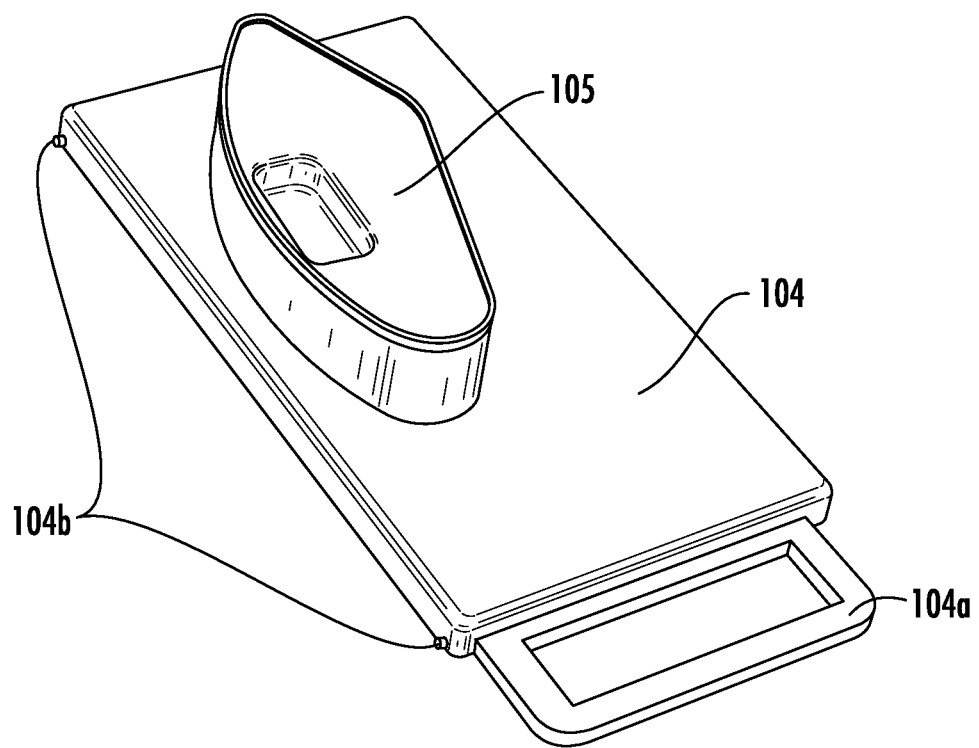
FIG. 12 illustrates a top perspective view of one example of the tray of FIG. 11 mounted on the caddy of FIG. 8.

FIG. 11 illustrates a top perspective view of one example of a disposable molded tray 105. The disposable tray may be pre-loaded with a suitable animal-derived organ, such as a porcine heart and lung block that has a pneumatically-actuated balloon inserted in the heart and no-drip connections to the arterial and venous vascularization such that IV bags filled with artificial (theater) blood may be attached to perfuse the heart/lung block. To facilitate proper storage and handling, the tray may be sealed in a vacuum bag. A 20-25% ethanol solution can be used as a preservative for the tray and tissue. The loaded and sealed tray may be referred to as a "cassette". Once the operation is complete, the tray with organs may be disposed of. If surgery needs to be restarted, a new cassette may simply be placed on the surgical simulation assembly 100.

The tray 105 includes an indentation 105a sized to receive organs, thereby creating an organ cavity. Both the tray 105 and the support base 101 may also contain one or more graduated troughs for housing tube and hoses, channels for housing additional tubes and drainage channels with apertures (not shown). The hoses may be air hoses and tubes housed in the trough and channels to simulate a beating heart or blood flood through the simulated organs. Both the tray 105 and the support base 101 may also further include a recess or recesses for containing the tubes and hoses within the troughs. In particular, the indentation 105a receives the heart and holds the heart in a position to simulate the relative location of the human heart.

In operation, the tubes and hoses may provide some combination of one or more pneumatic supply lines, one or more pressurized fluid supply lines or, optionally, one or more instrument communication buses. To keep the hoses within the troughs and channels, a plate (not shown) may be positioned within a plate recess created in the tray 105. The plate, when positioned in the plate recess, covers the hoses before affixing the simulator organs to the tray 105. In this manner, the tubes are concealed under the organs to create a more realistic surgical environment.

In the illustrated example, the tray 105 has an indentation 105a, which is designed for use with porcine organs. However, those skilled in the art will recognize that the tray may be utilized in connection with or specifically designed to be utilized in connection with other animal organs, as well as human cadaver organs (as may be desired).

Figure 13:
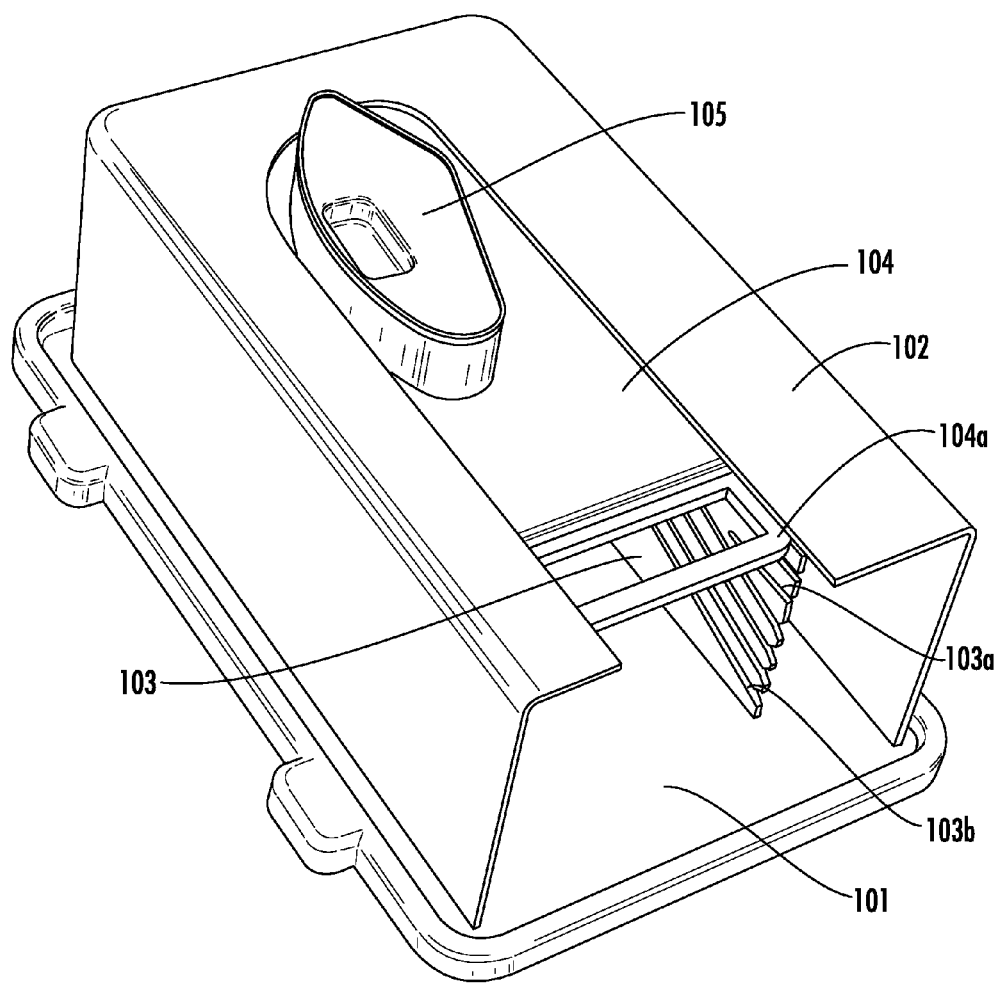
FIG. 13 illustrates a top perspective view of the tray and caddy of FIG. 12 positioned within the stand of FIG. 3.

FIG. 12 illustrates a top perspective view of the caddy 104 and tray 105 showing the handle 104a and side pegs of the caddy 104b. As illustrated by FIG. 13, the caddy 104 and tray 105 sit under the stand 102 by being slidably engaged within the slots 103a and 103b of the opposing plates 103 located on the support base 101. The slots 103a and 103b in the stand provide an approach for adjusting the position of the caddy inside the skeletal rib cage both up and down (i.e. closer to the collarbone or away from the collarbone) and another adjustment of the carrier tray such that it moves closer to the sternum (center of body) or closer to the rib cage (away from center of body) (i.e., the 1-2" of forward or backward movement). This positioning of the carrier tray within the model may be important in establishing a realistic surgical simulation. If the carrier tray is not in an anatomically correct position, the operation surgeon may be at a disadvantage and may not learn the desired skills. It should be noted that there is significant variability in the size and shape of the animal tissue that is normal within the porcine population. This variability is highly desired in the training process because it replicates the variability experienced in the human patient population. In other training simulation methodologies, such as computer generated images or virtual reality systems, the same anatomy is repeated presented and there is no or little variability.

Figure 14:
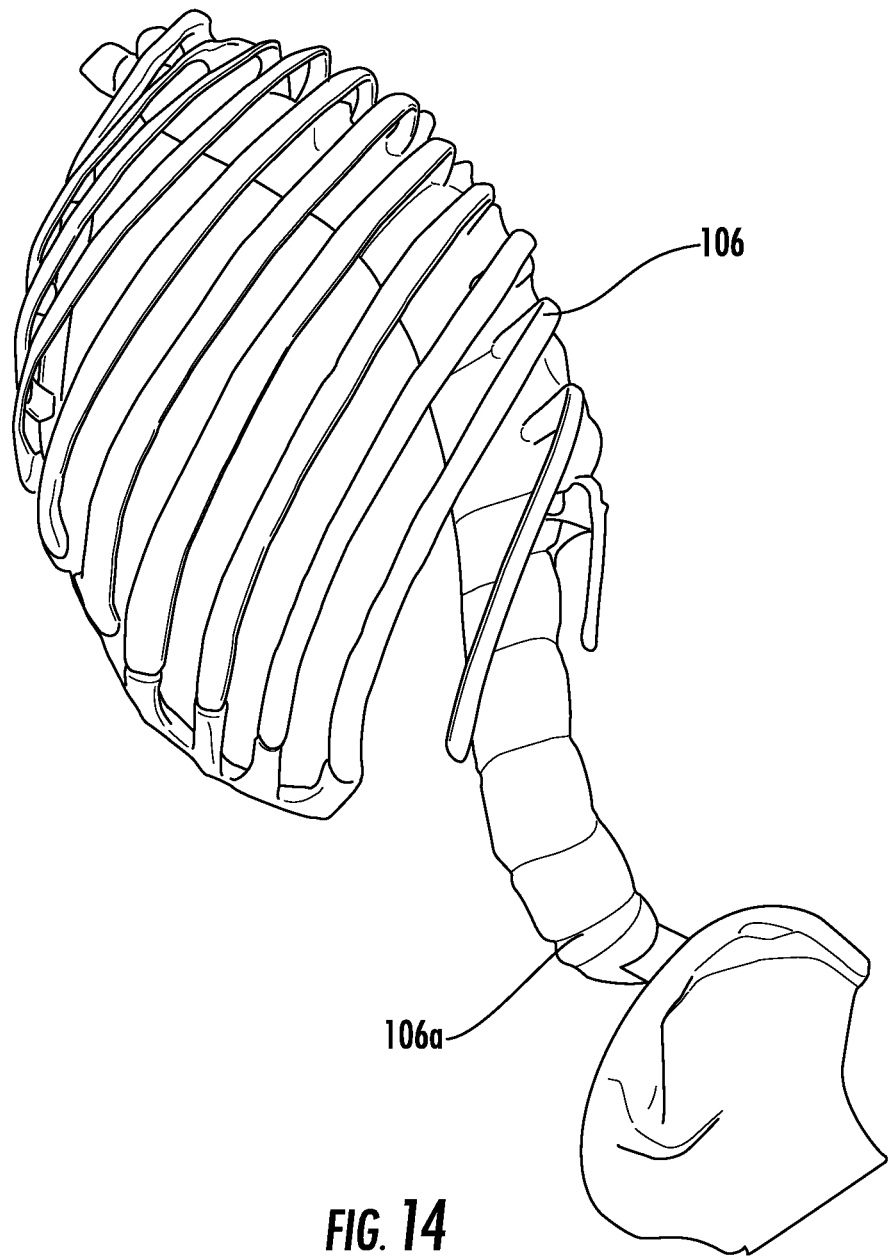
FIG. 14 illustrates a top perspective view of one example of a simulated surgical skeleton.

FIG. 14 illustrates a top perspective view of an example of a simulated human skeleton 106, including a portion of the human rib cage, spinal column and pelvis. The pelvis may be joined to the spinal column 106a at a fixed angle of between 25 degrees and 45 degrees, with 30 degrees being optimal. Alternatively, the pelvis may be joined to the spinal column with a hinge allowing positioning of the pelvis at any angle within the range of the hinge opening allowing for the bend to be made during surgery at a desired angle. This is done to simulate what is done in actual thoracic surgery in order to expand the rib cage and/or reposition the torso to better facilitate surgical conditions and response to such surgical conditions.

Figure 15:
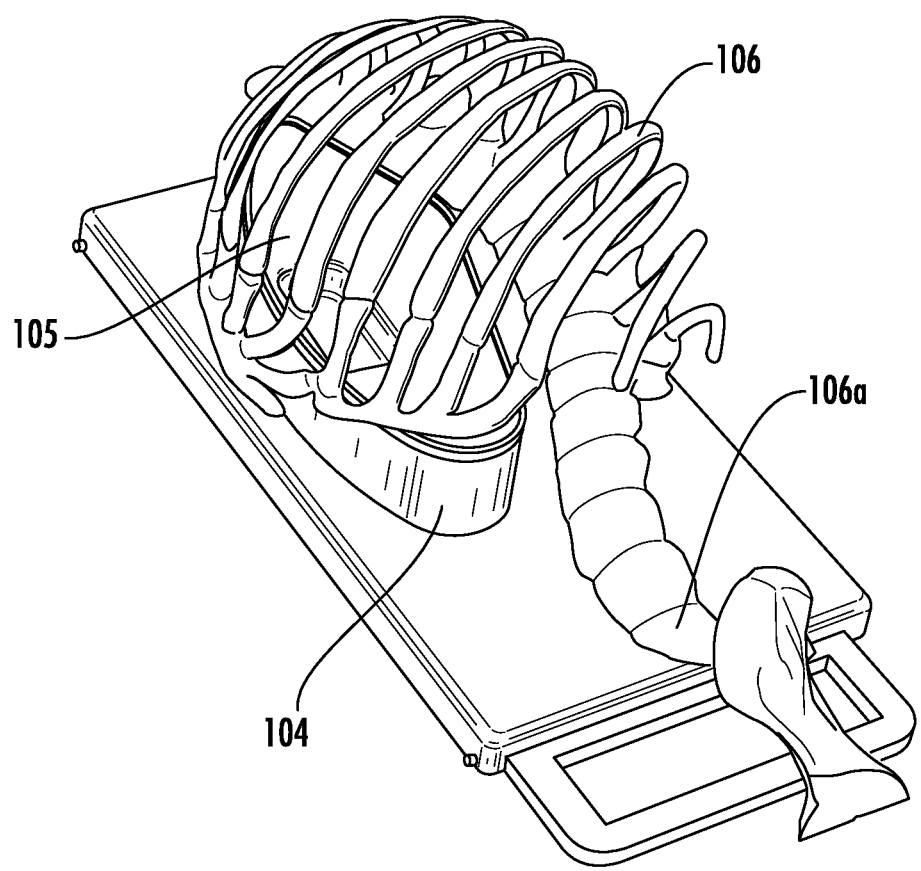
FIG. 15 illustrates a top perspective view of the simulated surgical skeleton of FIG. 14 resting over the cassette of FIG. 12.
Figure 16:
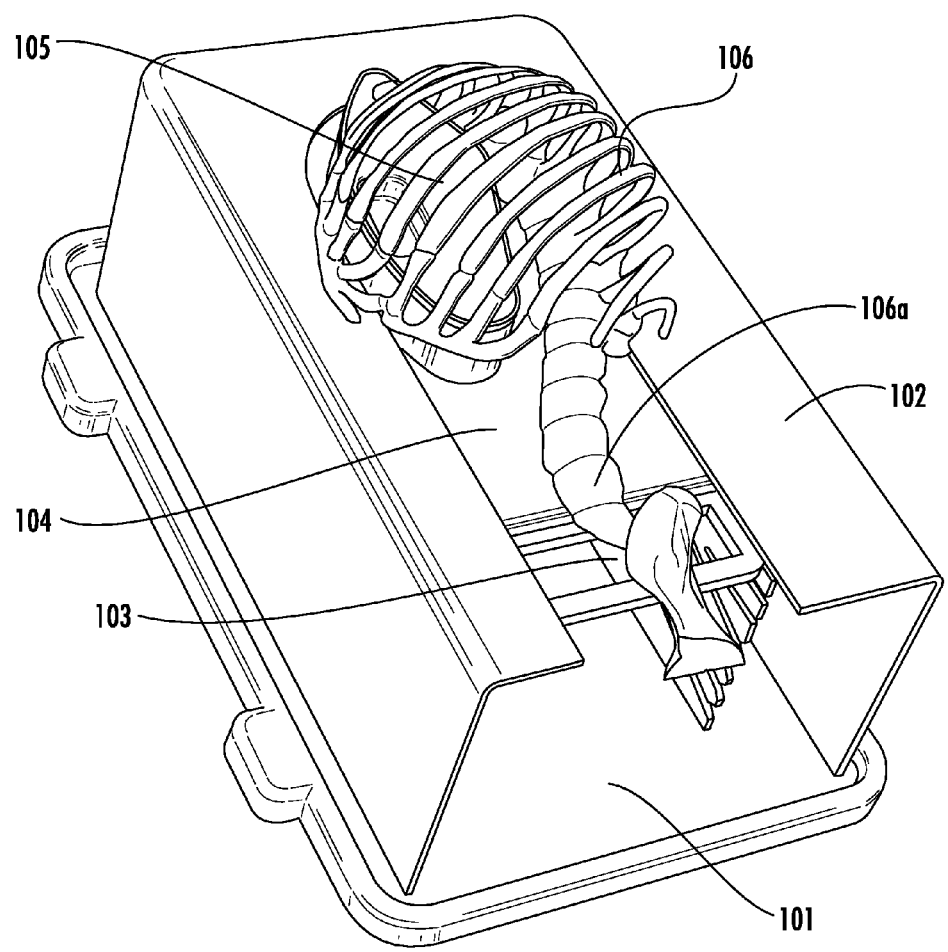
FIG. 16 illustrates a top perspective view of the simulated surgical skeleton of FIG. 14 resting on the stand of FIG. 3 and positioned over the cassette of FIG. 12.
Figure 17:
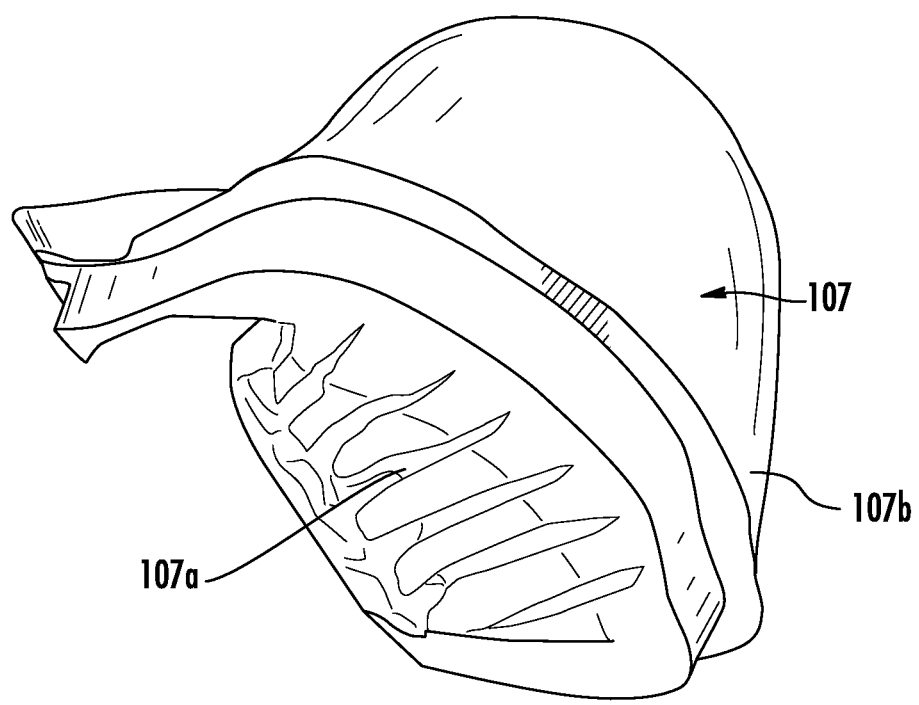
FIG. 17 illustrates a side perspective view of one example of simulated human skin for covering the shoulder area of the simulated surgical skeleton of FIG. 14.

As illustrated by FIGS. 15 and 16, the rib cage of the simulated skeleton 106 rests over the tray 105 on the caddy 106. FIG. 17 illustrates a side perspective view of one example of simulated human skin to cover the shoulder area of the simulated skeleton 106. The innermost layer 107a may be dyed to resemble the red muscles between the ribs and outer layer 107b resembles one of several human skin colors. The simulated skin is molded so that the red layer 107a protrudes slightly between the ribs and locks into the rib cage, providing a realistic look when viewed from a vision system placed inside the thorax.

The skin or covering for the skeleton may be formed as two separate/separable layers, where the inner layer is simulates muscle tissue clipped to the ribs. In addition, the ribs may include numbering indicia thereon (not shown), visible by the vision system from within the skeleton to assist the user in identifying the location within the skeleton 106.

Figure 18:
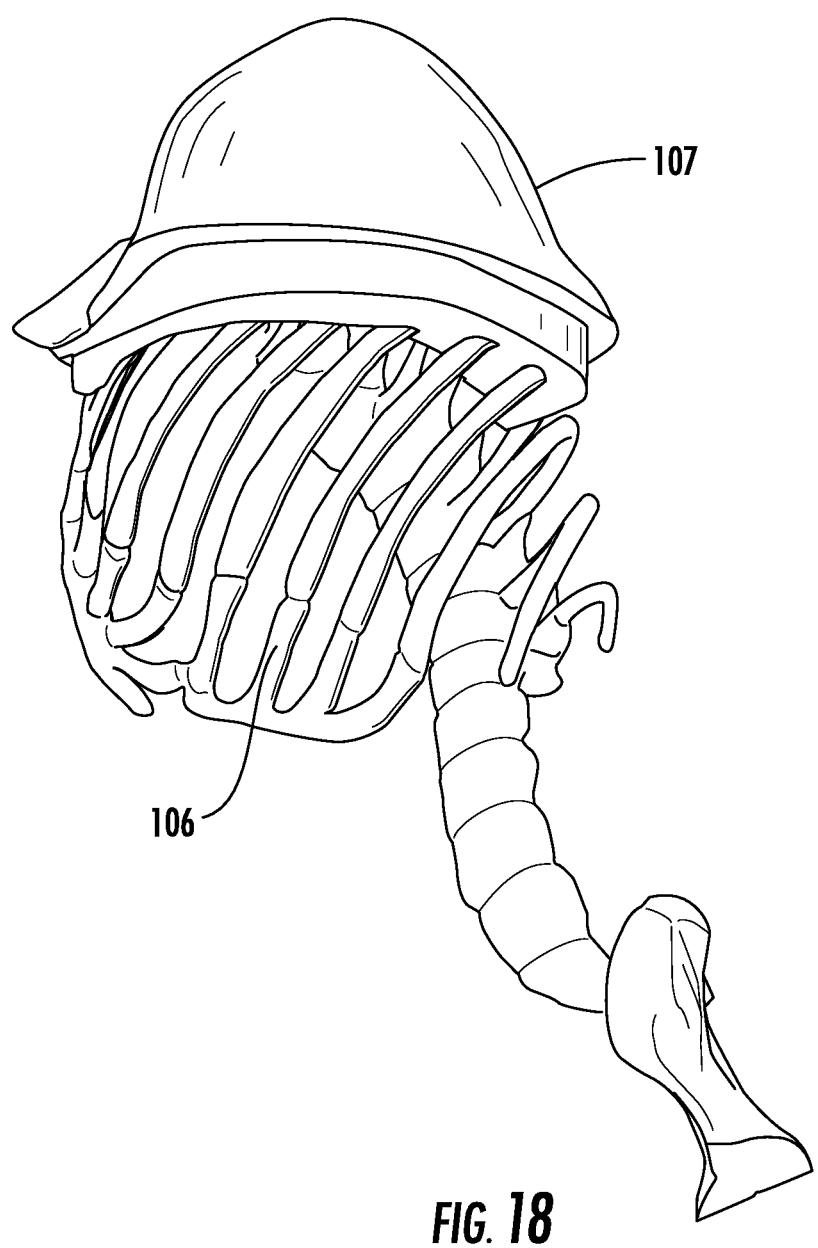
FIG. 18 illustrates a side perspective view of the simulated skin of FIG. 17 mounted on the shoulder area of the simulated surgical skeleton of FIG. 14.
Figure 19:
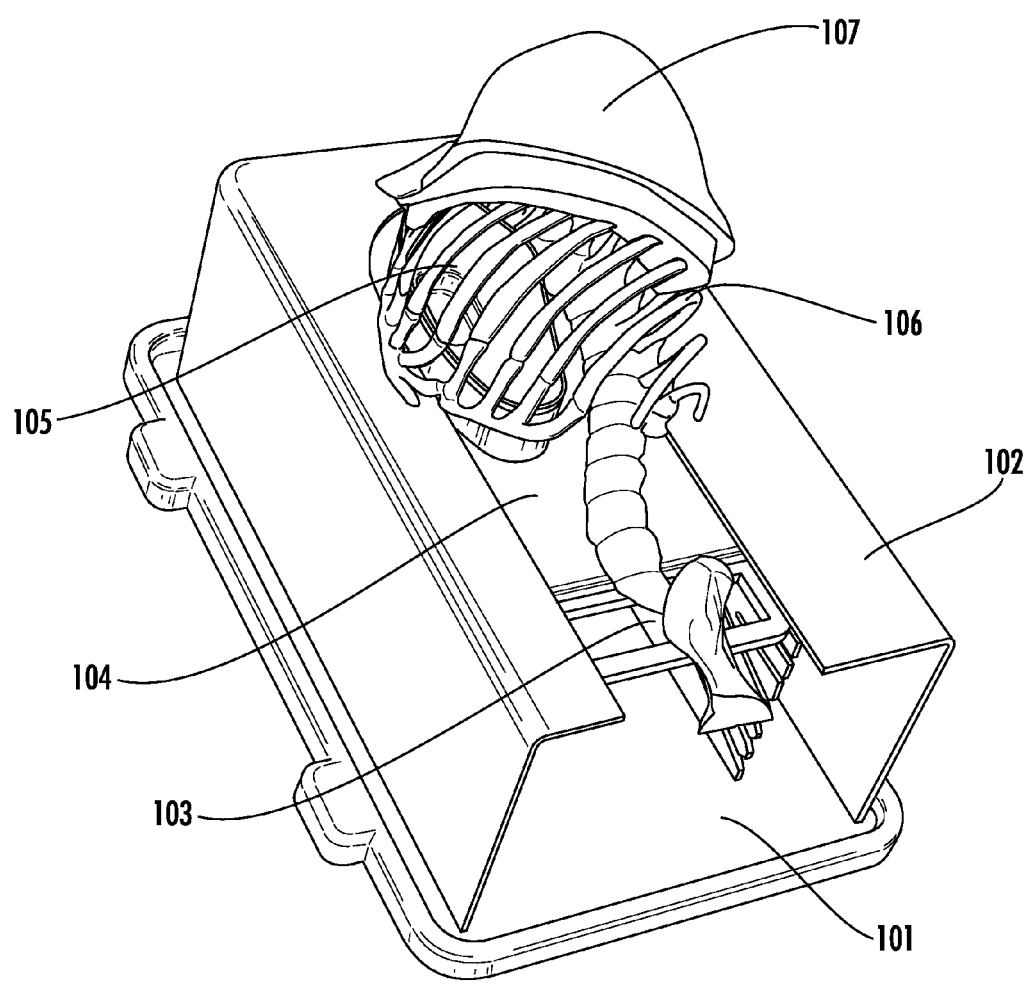
FIG. 19 illustrates a top perspective view of the simulated surgical skeleton of FIG. 14 upon which is mounted the simulated surgical skin of FIG. 17 resting on the stand of FIG. 3 above the cassette of FIG. 12.
Figure 20:
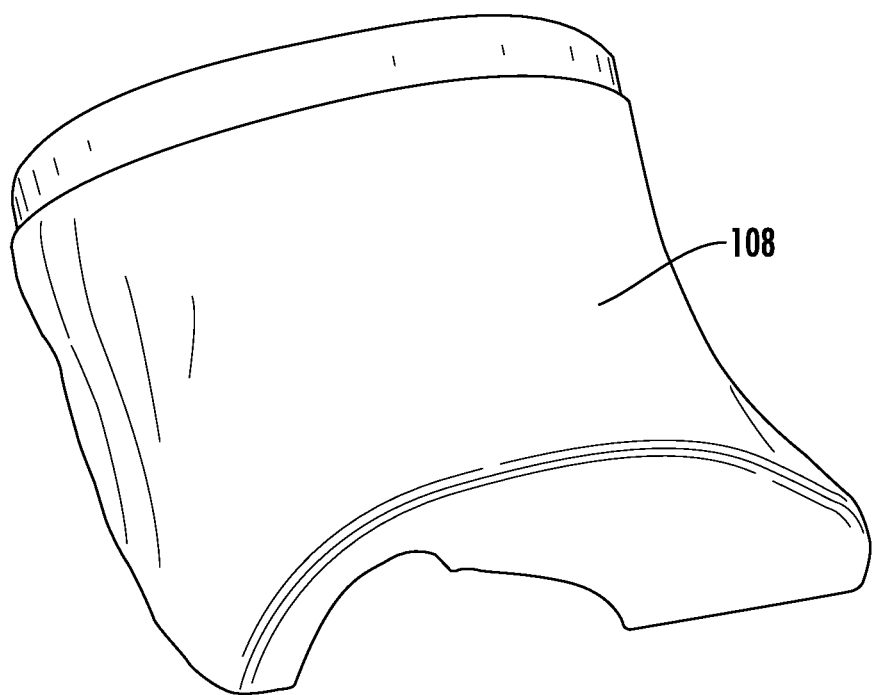
FIG. 20 illustrates a top perspective view of one example of simulated human skin for covering the lower spine and pelvis area of the simulated surgical skeleton of FIG. 14.
Figure 21:
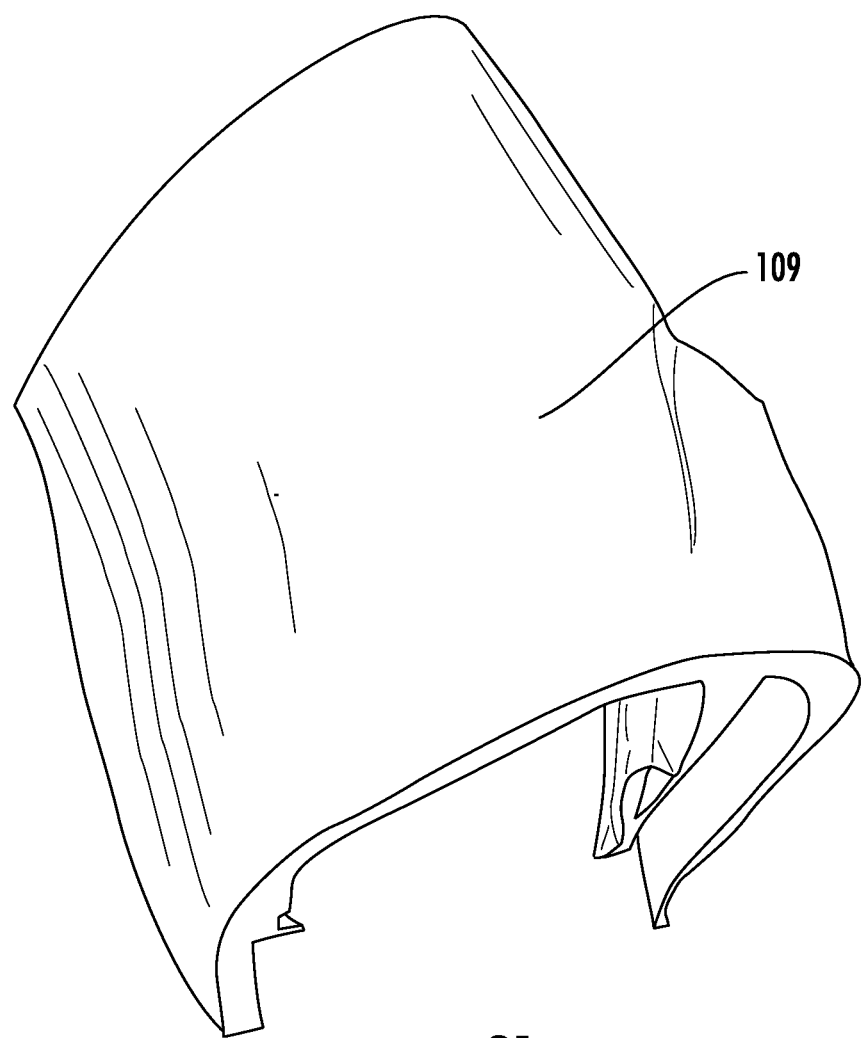
FIG. 21 illustrates a top perspective view of one example of simulated human skin covering the thorax area of the simulated surgical skeleton of FIG. 14.
Figure 22:
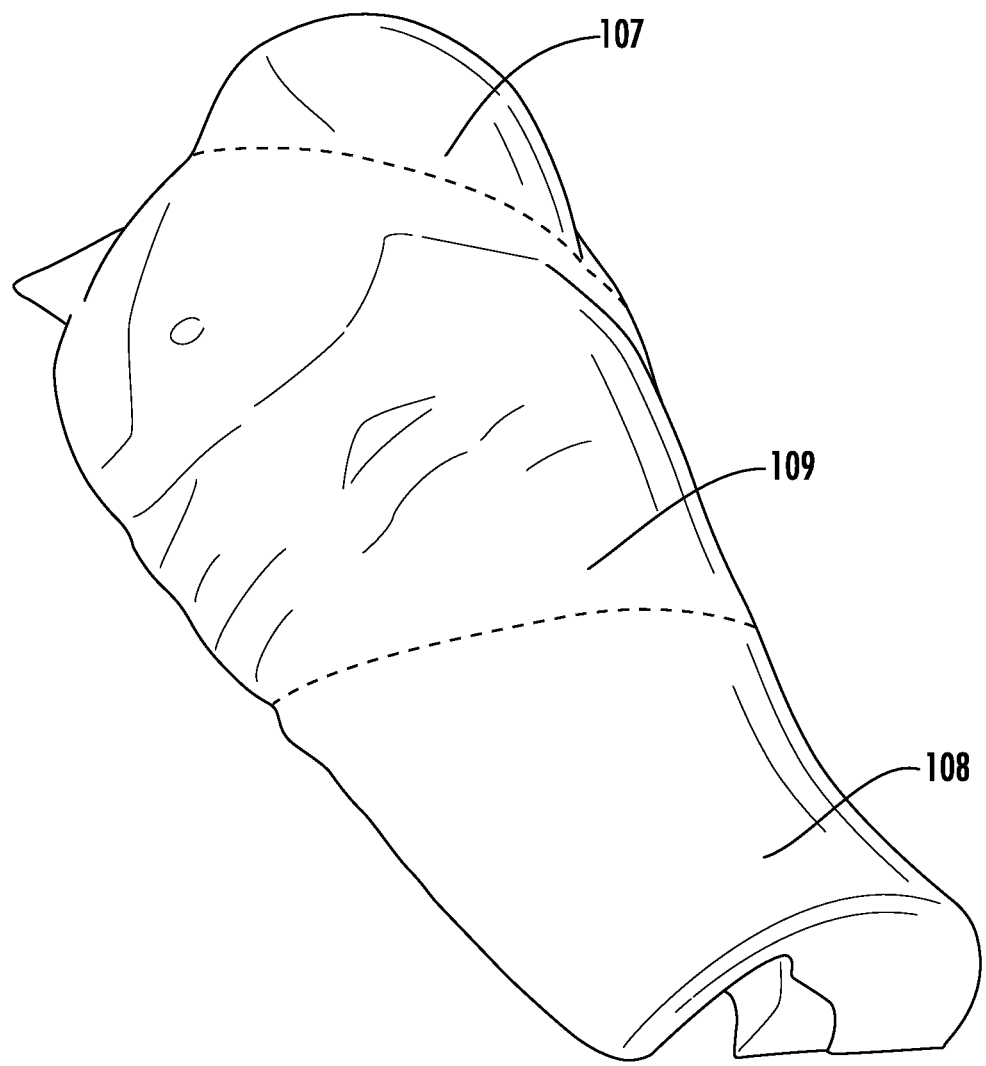
FIG. 22 illustrates a top perspective view of the simulated human skin of FIGS. 17, 20 and 21 mounted upon the simulated surgical skeleton of FIG. 14.

FIGS. 18 and 19 show the simulated skin 107 positioned over the shoulder area of the simulated skeleton 106 and the skeleton positioned atop the caddy 104 and tray 105. As shown in FIGS. 20 and 21, additional parts of the torso may be covered by additional pieces of skin, such as a piece covering the lower spinal and pelvic areas 108 and the midsection of the thorax 109. These pieces may also be dyed similarly to the simulated skin covering the shoulder area, and may also be molded so that the inner layer is able to lock into the underlying parts of the simulated skeleton 107. As illustrated by FIG. 22, when all three pieces of simulated skin 107, 108 and 109 are applied to the simulated skeleton 107 the result realistically simulates the human torso on its side. While this embodiment teaches the skin to be made in three pieces, the skin may be made of one or more pieces.

Figure 23:
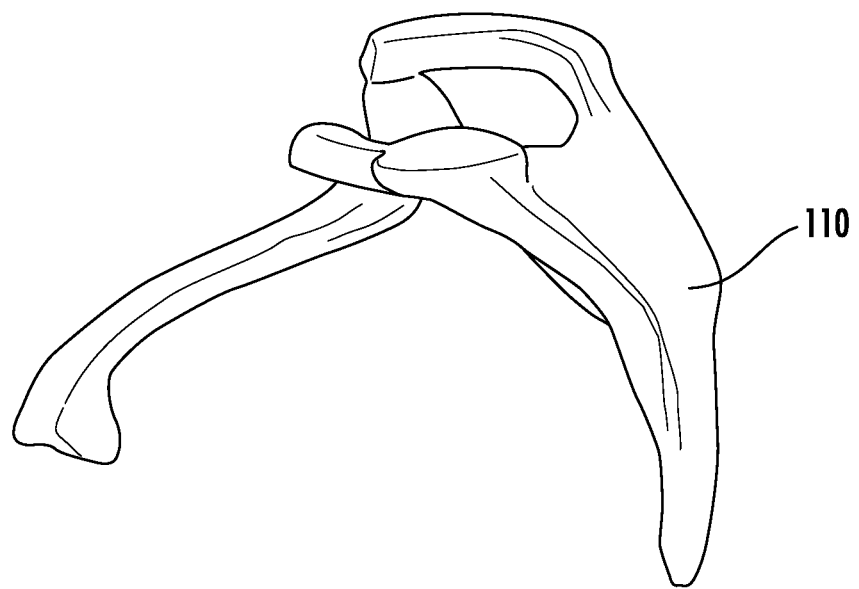
FIG. 23 illustrates a side perspective view of one example of one implementation of a simulated human clavicle.
Figure 24:
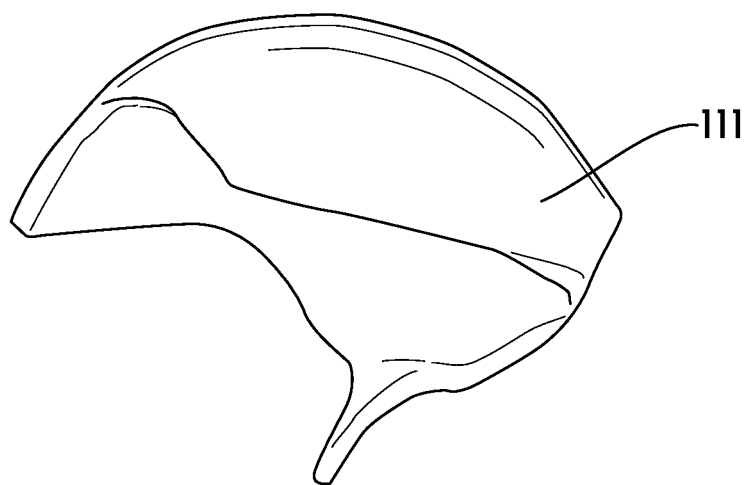
FIG. 24 illustrates a side perspective view of one example of a simulated human diaphragm.

FIGS. 23 and 24 illustrate a top perspective view of a simulated clavicle 110 and diaphragm 111 for the simulated patient. The clavicle 110 and the diaphragm 111 may both be attached to the simulated skeleton 106, for example, with clear plastic rods or other engagement mechanisms. During the set-up of a surgery event, these features may serve as "landmarks," along with the rib cage to determine where to make incisions and where to place various minimally invasive probes, such as robotic arms of surgery robots. The skin should be made of a material that facilitates the cutting of the skin, similar to that provided by surgery, and that allows for the user to locate the skeletal parts under the skin to locate the surgical landmarks.

In operation, a lightly pressurized water/paint mixture resembling blood may be provided to the simulated organs through tubing connected to the organ. In this manner, blood emulating fluid may be provided to the organ. For example, when pumped into the heart, the fluid may be pumped into a divided right pulmonary artery and a divided right superior pulmonary vein to distend and pressurize the venous and arterial systems. Static fluid pressure within the vessels may be achieved using gravity flow from a one-liter IV bag. Pressure may be limited to avoid severe pulmonary edema. Extended perfusion times (1-2 hours) may be maintained without substantial fluid leakage into the airways by preparing the porcine organ block to occlude the left mainstem bronchus to inhibit leaking and loss of pressure.

Because blood emulating fluid is provided to the organ for simulation, certain of the fluid will be released during the surgical simulation, such as when the animal tissue is cut. The fluid may then be drained from the tray 105 or the support base 101 through a drainage aperture (not shown) and collected in a containment bag (not shown). Once the surgery is completed, the organs are disconnected from the air pump and any other extraneous devices or elements (i.e., IV for perfusion of fluids). The tray 105 and organs can then be placed within the containment bag (not shown), along with any collected fluid and disposed. Another containment bag can then be placed within the model and another tray 105 can be placed within the model to simulate another surgery. Those skilled in the art will recognize that other devices and structures, in addition to a containment bag, may be utilized to collect and remove the fluid from the surgical procedure.

A prepped tray 105 may contain organ blocks containing the heart with pericardium, lungs, trachea, esophagus and 10-12 inches of aorta (all not shown). The organ blocks may be harvested from animals butchered for food.

The affixed animal organ block heart with one or more lungs may be affixed to the tray 105 by two or more block tie ropes (not shown). The organ block may be affixed, for example, by attachment to a trachea and an aorta of the heart lung block. The affixed organ block may be a pig heart lung block. Alternatively, the animal heart and lung may be a human cadaver heart and lung or may be taken from another animal.

To simulate surgery, the organs in the block are prepped with the tray 105 in advance for quick connection to a pump and other equipment used to simulate realistic surgical experience. Organ preparation starts with an incision of the pericardium on the right posterior side of the heart so that it could be reattached with no noticeable holes when viewed from the left side. The superior vena cava, inferior vena cava, right pulmonary artery, and right pulmonary veins are then divided with care taken to leave as much vessel length as possible. The right lung is then fully detached and the organs are washed extensively to remove coagulated blood from the heart and vessels. All divided vessels except for the main branch of the right pulmonary artery and right superior pulmonary vein are then tied off using 0-silk.

Small diameter plastic tubes with Luer-Lok® connectors are then placed into the divided right pulmonary artery and right superior pulmonary vein, and fixed using purse-string sutures. To create distention of the aorta, silicone caulking and with a one-half inch foam rod were injected to the level of the ascending aorta.

After the silicone has cured, the brachiocephalic trunk and left common carotid are tied off using 0-silk. Finally, the left mainstem bronchus was occluded by stapling the divided right mainstem bronchus as well as the proximal trachea. The left hilum remained unaltered, and all modifications to the heart were hidden by the pericardium during the procedure. Following preparation, the organs may be stored at 4 degrees Celsius in 10% ethanol containing teaspoon of red food coloring, where they will remain fresh for at least 1 month. Alternatively, 40% ethanol can be used to preserve the organs for over a year to 18 months and still perform as well as freshly harvested organs. Organs may be stored in 40% ethanol prior to preparation. After preparation, organs may be stored in less than 30 ml of 20% ethanol and vacuum sealed. Organs may be treated with ozone prior to preparation. Prepared organs may be stored under refrigeration or lightly frozen.

The porcine organ block can be affixed to, or positioned on, the tray 105. For purposes of simulating a human, the porcine heart can be rotated to emulate the position of a human heart in a torso. For example, the left side of the porcine heart can be placed into the indentation 105a of the tray 105 with the left lung placed over an inflatable air bladder.

Inflation and deflation of lungs of a real patient causes the rise and fall of the mediastinum. An appropriate volume of air or some other fluid may be used to inflate and deflate an appropriately sized and placed container hidden under the tissue to be animated with movement. For example a respiration rate of 20 breaths per minute can be simulated by periodically expanding an air bladder such as a whoopee cushion, or an empty one-liter IV bag that is folded in half.

A balloon placed in the heart and connected to a closed system air source to allow for emulating the beating of a heart (such as at a rate of 78 beats per minute) adds to the sense of realism of the staged reality event.

Thus, this staged reality module could be animated by providing one quick connect fitting to connect the heart balloon to the air supply (i.e., motor) to provide the beating heart effect by pneumatic lines (not shown). A second quick connect fitting to a different pneumatic line (not shown) could provide the lung movement air. A quick connect of a fluid connection to hydraulic or fluid line (not shown) with blood vessels allows for slightly pressured simulated blood to be provided. As used in this embodiment, a quick connect fitting is one that may be connected to a corresponding fitting without the use of tools. A quick connect fitting may be used to connect to hydraulic line, pneumatic line, electrical line, or digital communication bus.

The assembly 100 may also include straps or other attachment mechanisms (not shown) for attaching the simulated skeleton 106 to the stand 102. The assembly 100 may also be equipped with a pole for hanging an intravenous (IV) fluid line(s).

Figure 25:
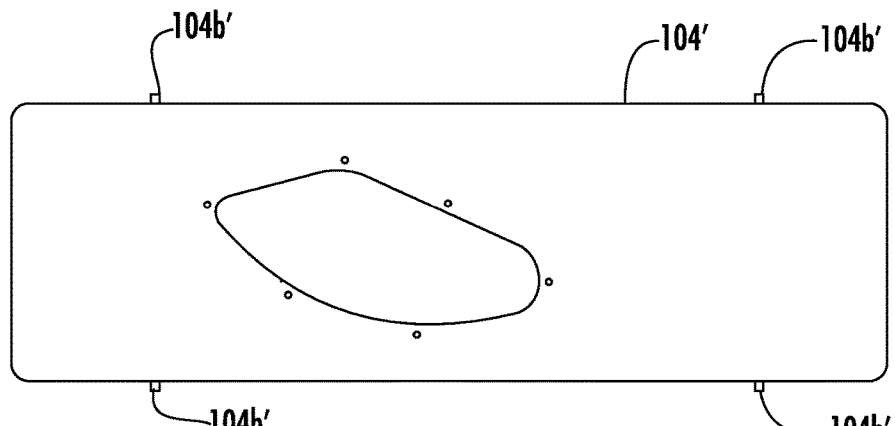
FIG. 25 is a top view of a caddy used in an embodiment of the invention.
Figure 26:
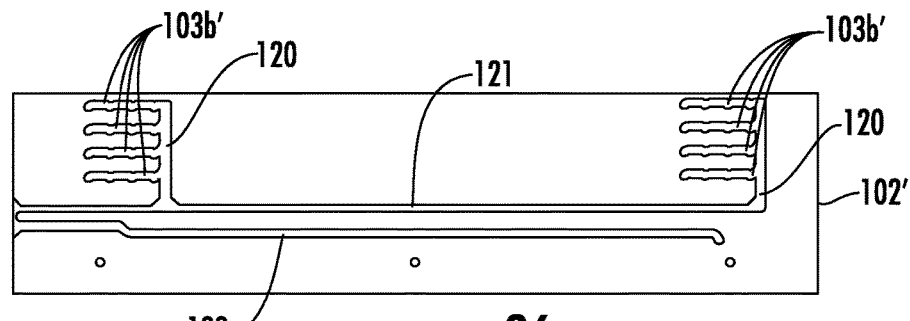
FIG. 26 is an interior side view of a wall of the stand in an embodiment of the invention.
Figure 27:
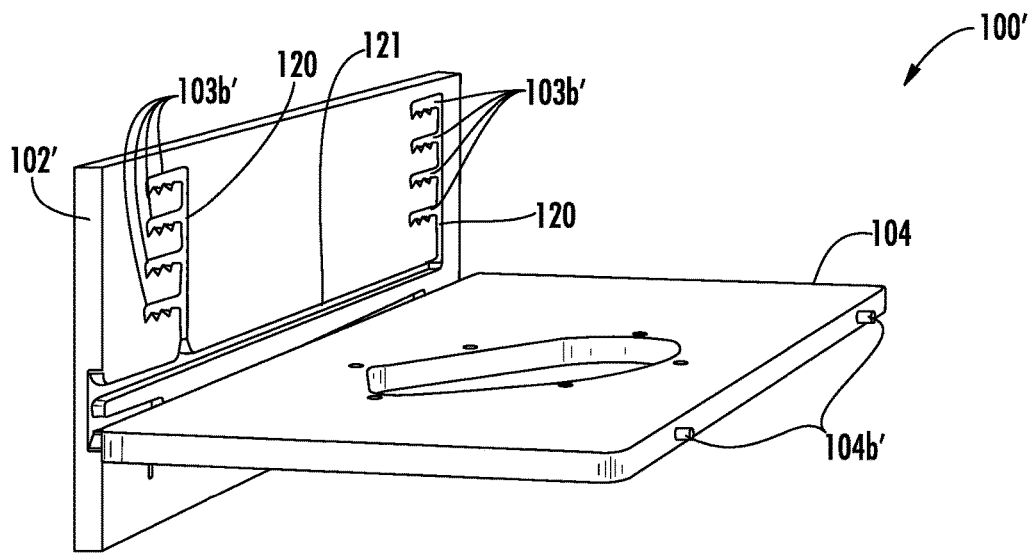
FIG. 27 is a partial perspective view showing the caddy as shown in FIGS. 25 and 26 in a storage position.
Figure 28:
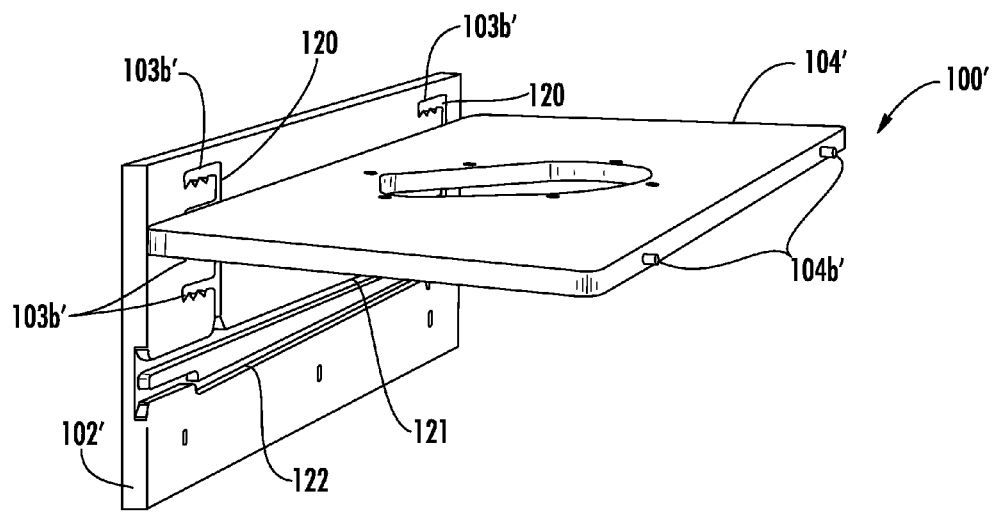
FIG. 28 is a partial perspective view showing the caddy as shown in FIGS. 25 and 26 in a working position.

Turning now additionally to FIGS. 25-31, various components of other variations of the system 100' are now described. In particular, as shown in FIG. 25, the caddy 104' includes a pair of pegs or projections 104b' on each side that engage corresponding notched slots 103b' (FIGS. 26-28) to permit both selectable vertical and horizontal positioning as will be appreciated by those skilled in the art. In particular, each set of notched slots 103b' communicate with a respective vertical slot 120, which, in turn, communicates with a full length horizontally extending slot 121 on each side of the stand 102, as perhaps most easily understood with reference to FIG. 26. In addition, a full length, lowermost, horizontal slot 122 is also provided to permit storage/transportation of the caddy 104 within the stand 102 (FIG. 27) prior to repositioning for use (FIG. 28).

In these embodiments, the slots are formed in or through the sidewalls of the stand 102'. Based on the number of detents or depressions in each slot 103b' being four, and the number of vertical positions defined by the slots being four, the caddy 104' has sixteen possible set positions relative to the stand 102' in the illustrated embodiment. For example, these sixteen positions can extend over 2.25 inches vertically and 2.25 inches horizontally. Of course, other configurations and numbers of positions are possible.

Figure 29:
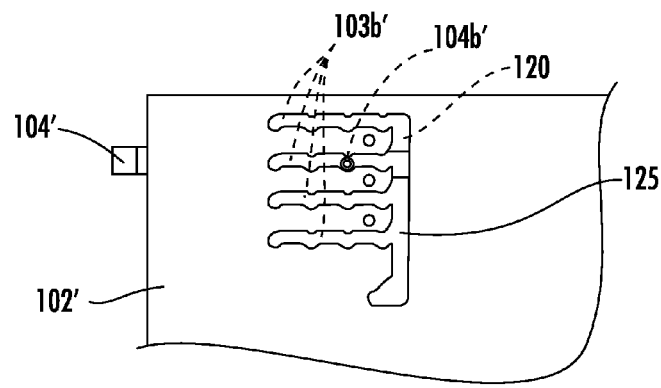
FIG. 29 is a partial exterior side view of a portion of the stand shown in FIGS. 26-28.

With additional reference to FIG. 29, another feature in the illustrated embodiment is the provision of a transparent or translucent window 125 in the sidewall of the stand 102' that permits the user to view the end of a peg or projection 103b'. Such a window 125 can be provided at the other positions corresponding to sets of slots 103b' for additional user convenience, as will be appreciated by those skilled in the art.

Figure 30:
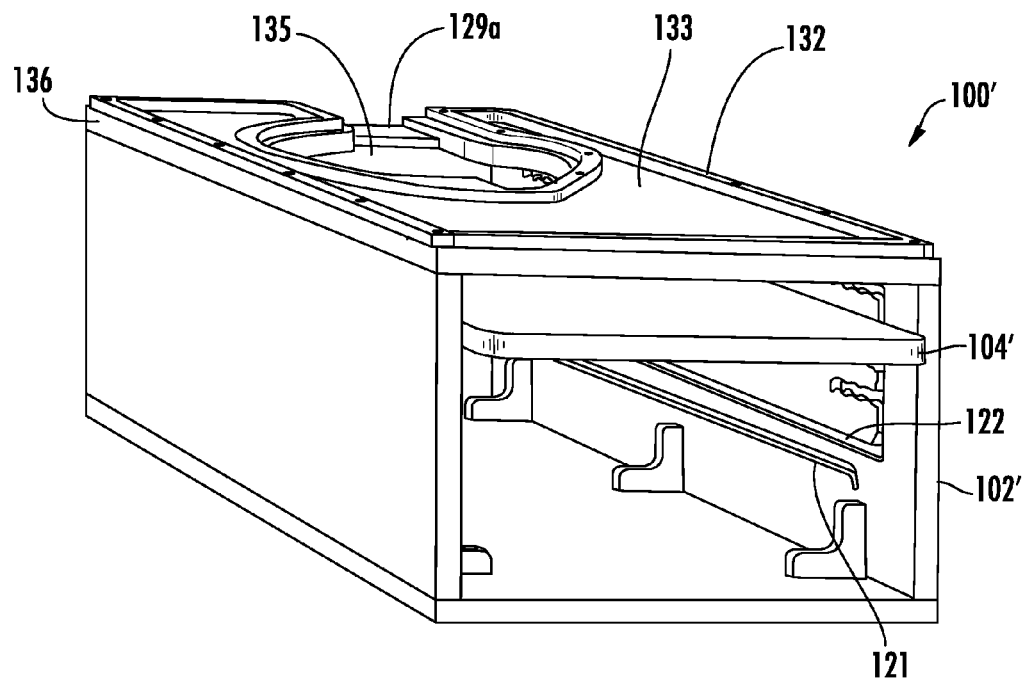
FIG. 30 is a front perspective view of a portion of an embodiment of the system with the topmost platform removed for clarity.
Figure 31:
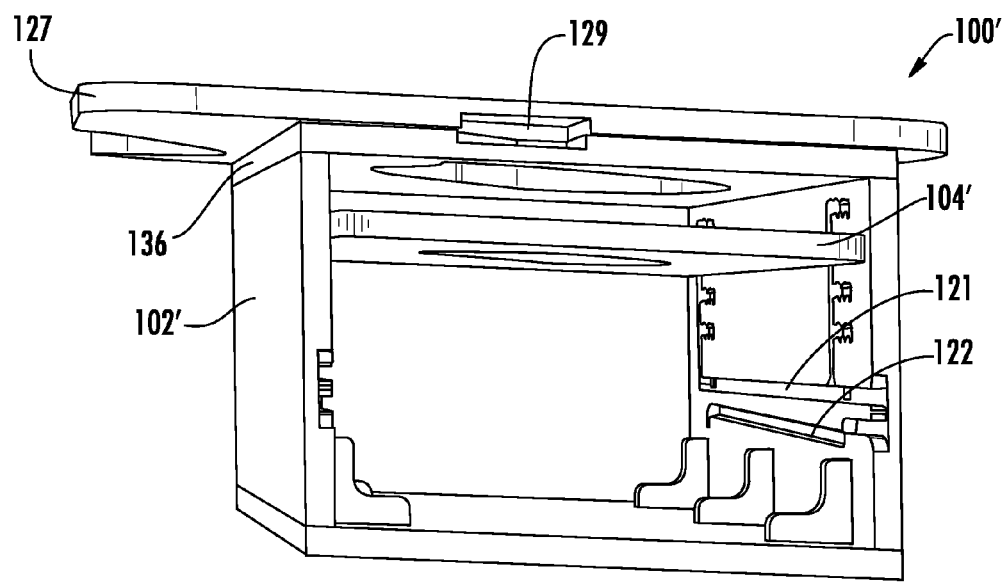
FIG. 31 is a rear perspective view of the stand of FIG. 30 with the topmost platform attached.
Figure 32:
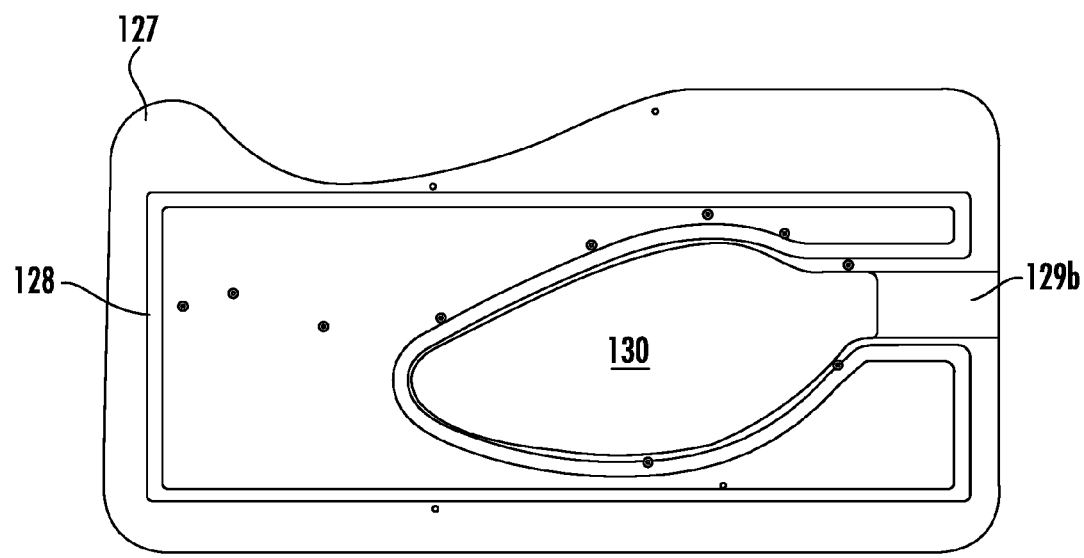
FIG. 32 is a bottom plan view of the topmost platform shown in FIG. 31.

Referring now additional to FIGS. 30-32, another aspect of the system 100' is now described. In this variation, a top wall 136 of the stand 102' includes a ridge 132 that extends upwardly around an outer periphery and around the periphery of the medial opening 135 (FIG. 30). The stand 102' also includes a topmost platform 127 (FIGS. 31-32) with a medial opening 130 aligned with the medial opening 135 in the top wall 136. The topmost platform 127 also includes a corresponding keyed recess 128 that is keyed to the ridge 132 of the top wall 136. The top wall 136 also includes a partial end recess 129a (FIG. 30) that aligns with a corresponding partial end recess 129b in the topmost platform 127 (FIG. 32) to define a channel 129, as shown in FIG. 31. The ridge 132 and keyed recess 128 provide for proper relative positioning, and provide a barrier to prevent liquids from travelling outside the stand 102. The channel 129 is illustratively located where the neck of the torso would be located and permits tubing to run therethrough to the animal tissue block as described above.

A method aspect is for surgical simulation and may comprise positioning a tray carrying animal tissue on a support structure, and manipulating the support structure to selectively horizontally and vertically position the tray relative to the support structure to thereby selectively horizontally and vertically position the animal tissue relative to a simulated human skeleton portion carried by the support structure. The method may also include covering the simulated human skeleton portion with simulated human skin, and performing at least one surgical procedure on the animal tissue while penetrating through the simulated human skeleton portion and simulated human skin.

As used herein animal tissue is meant to cover both harvested non-human animal tissue, as well as human cadaver tissue. The human cadaver tissue may also be animated as will be appreciated by those skilled in the art. In addition, while the disclosed embodiments are described based upon the thoracic region in a lateral orientation, in other embodiments, other orientations may be provided, such as supine, for example. Further, while a heart and lung block has been described, in other embodiments, different organ/tissue blocks may also be used.

It is to be understood that, while the invention has been described in conjunction with the detailed description, the foregoing description is intended to illustrate and not limit the scope of the invention. Other aspects, advantages, and modifications of the invention are within the scope of the claims set forth below. All publications, patents, and patent applications cited in this specification are herein incorporated by reference as if each individual publication or patent application were specifically and individually indicated to be incorporated by reference.

That which is claimed is:

1. A surgical simulation device comprising:
a support structure;
a tray carried by the support structure;
animal tissue carried by the tray;
a simulated human skeleton portion carried by the support structure above the animal tissue; and
simulated human skin covering the simulated human skeleton portion;
the support structure permitting selective horizontal and vertical positioning of the tray relative to the support structure to thereby permit selective horizontal and vertical positioning of the animal tissue relative to the simulated human skeleton portion and simulated human skin.

2. The surgical simulation device according to claim 1 wherein the support structure comprises:
a base support;
a stand carried by the base support; and
a caddy adjustably carried by the stand and receiving the tray thereon.

3. The surgical simulation device according to claim 2 wherein the stand comprises opposing walls, each wall having a plurality of vertically spaced, horizontally extending slots therein; and wherein the caddy comprises a set of projections extending outwardly and slidably received within selected ones of the slots.

4. The surgical simulation device according to claim 3 wherein each of the slots comprises a notched slot.

5. The surgical simulation device according to claim 1 wherein the simulated human skeleton portion comprises a spinal column and a rib cage coupled thereto.

6. The surgical simulation device according to claim 5 wherein the simulated human skin comprises an innermost layer and an outermost layer; and wherein the innermost layer protrudes between ribs of the rib cage.

7. The surgical simulation device according to claim 5 wherein the simulated human skeleton portion comprises a clavicle and scapula adjacent the rib cage.

8. The surgical simulation device according to claim 5 wherein the simulated human skeleton comprises a pelvis coupled to the spinal column at a fixed angle.

9. The surgical simulation device according to claim 5 wherein the simulated human skeleton comprises a pelvis coupled to the spinal column at an adjustable angle.

10. The surgical simulation device according to claim 1 further comprising a simulated human diaphragm within the rib cage.

11. The surgical simulation device according to claim 1 wherein the animal tissue comprises a heart and lung block.

12. The surgical simulation device according to claim 11 further comprising at least one animating device coupled to the heart and lung block.

13. The surgical simulation device according to claim 1 wherein the animal tissue comprises harvested porcine tissue.

14. The surgical simulation device according to claim 1 wherein the animal tissue comprises human cadaver tissue.

15. A surgical simulation device comprising:
a support structure configured to carry a tray holding animal tissue;
a simulated human skeleton portion carried by the support structure above the animal tissue; and
simulated human skin covering the simulated human skeleton portion;
the support structure permitting selective horizontal and vertical positioning of the tray relative to the support structure to thereby permit selective horizontal and vertical positioning of the animal tissue relative to the simulated human skeleton portion and simulated human skin.

16. The surgical simulation device according to claim 15 wherein the support structure comprises:
a base support;
a stand carried by the base support; and
a caddy adjustably carried by the stand and receiving the tray thereon.

17. The surgical simulation device according to claim 16 wherein the stand comprises opposing walls, each wall having a plurality of vertically spaced, horizontally extending slots therein; and wherein the caddy comprises a set of projections extending outwardly and slidably received within selected ones of the slots.

18. The surgical simulation device according to claim 17 wherein each of the slots comprises a notched slot.

19. The surgical simulation device according to claim 15 wherein the simulated human skeleton portion comprises a spinal column and a rib cage coupled thereto.

20. The surgical simulation device according to claim 19 wherein the simulated human skin comprises an innermost layer and an outermost layer; and wherein the innermost layer protrudes between ribs of the rib cage.

21. The surgical simulation device according to claim 15 wherein the animal tissue comprises a heart and lung block; and further comprising at least one animating device to be coupled to the heart and lung block.

22. A method for surgical simulation comprising:
positioning a tray carrying animal tissue on a support structure;
manipulating the support structure to selectively horizontally and vertically position the tray relative to the support structure to thereby selectively horizontally and vertically position the animal tissue relative to a simulated human skeleton portion carried by the support structure;
covering the simulated human skeleton portion with simulated human skin; and
performing at least one surgical procedure on the animal tissue while penetrating through the simulated human skeleton portion and simulated human skin.

23. The method according to claim 22 wherein the support structure comprises:
a base support;
a stand carried by the base support; and
a caddy adjustably carried by the stand and receiving the tray thereon.

24. The method according to claim 23 wherein the stand comprises opposing walls, each wall having a plurality of vertically spaced, horizontally extending slots therein; and wherein the caddy comprises a set of projections extending outwardly and slidably received within selected ones of the slots.

25. The method according to claim 24 wherein each of the slots comprises a notched slot.

26. The method according to claim 22 wherein the simulated human skeleton portion comprises a spinal column and a rib cage coupled thereto; wherein the simulated human skin comprises an innermost layer and an outermost layer with the innermost layer protruding between ribs of the rib cage.

27. The method according to claim 22 wherein the animal tissue comprises a heart and lung block; and further comprising animating at least one of the heart and lung.

* * * * *